United States Patent
Ishida et al.

(10) Patent No.: US 9,355,347 B2
(45) Date of Patent: May 31, 2016

(54) CARD, INFORMATION PROCESSING UNIT, AND RECORDING MEDIUM HAVING INFORMATION PROCESSING PROGRAM

(71) Applicant: Sony Corporation, Tokyo (JP)

(72) Inventors: Takehisa Ishida, Kanagawa (JP); Nobuyuki Nagai, Kanagawa (JP); Yusaku Kato, Tokyo (JP); Hideo Kawabe, Saitama (JP); Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/649,371

(22) PCT Filed: Oct. 21, 2013

(86) PCT No.: PCT/JP2013/006219
§ 371 (c)(1),
(2) Date: Jun. 3, 2015

(87) PCT Pub. No.: WO2014/091658
PCT Pub. Date: Jun. 19, 2014

(65) Prior Publication Data
US 2015/0317552 A1    Nov. 5, 2015

(30) Foreign Application Priority Data

Dec. 13, 2012  (JP) .................. 2012-272140

(51) Int. Cl.
*G06F 17/00* (2006.01)
*G06K 19/07* (2006.01)
*A63F 13/79* (2014.01)
*A63F 1/02* (2006.01)
*A63F 9/24* (2006.01)

(52) U.S. Cl.
CPC ............. *G06K 19/0716* (2013.01); *A63F 1/02* (2013.01); *A63F 13/79* (2014.09); *A63F 2009/2442* (2013.01); *A63F 2009/2489* (2013.01); *A63F 2250/1005* (2013.01)

(58) Field of Classification Search
CPC ............ G06F 17/00; G06K 5/00; G06K 7/00; G06K 19/00
USPC ................. 235/375, 487, 380, 439, 440, 488
See application file for complete search history.

(56) References Cited

U.S. PATENT DOCUMENTS

| 6,027,958 A * | 2/2000 | Vu ................... H01L 21/568 257/679 |
| 2003/0163287 A1* | 8/2003 | Vock et al. ................... 702/187 |
| 2010/0247133 A1* | 9/2010 | Sugahara ............... B41J 29/38 399/81 |

(Continued)

FOREIGN PATENT DOCUMENTS

JP         2005-073711 A    3/2005
WO    WO 2008/150600 A1    12/2008

*Primary Examiner* — Edwyn Labaze
(74) *Attorney, Agent, or Firm* — Wolf, Greenfield & Sacks, P.C.

(57) ABSTRACT

A card is provided comprising an information setting unit configured to output a first signal including unique information of the card, and a bending sensor configured to output a second signal corresponding to a curvature of the card. An information processing apparatus is also provided comprising a card reading unit configured to acquire information from a card a processor, and a memory device. The memory device stores instructions which when executed by the processor, causes the processor to acquire unique information from the card, and acquire curvature information from the card corresponding to a curvature of the card.

20 Claims, 28 Drawing Sheets

(56) References Cited

U.S. PATENT DOCUMENTS

| | | |
|---|---|---|
| 2010/0311502 A1 | 12/2010 | Miller et al. |
| 2010/0320274 A1* | 12/2010 | Nielsen .............. G06K 19/0705 235/492 |
| 2011/0307214 A1* | 12/2011 | Saitou ..................... G01B 7/18 702/155 |
| 2014/0049421 A1* | 2/2014 | Grosinger ............... G01S 7/412 342/146 |

* cited by examiner

BENDING

TWISTING

FLIPPING

CARD, INFORMATION PROCESSING UNIT, AND RECORDING MEDIUM HAVING INFORMATION PROCESSING PROGRAM

TECHNICAL FIELD

The present technology relates to a card having unique information, and an information processing unit and a recording medium having an information processing program using the unique information of the card.

BACKGROUND ART

A card game played using a specially designed card, called trading card game (TCG), is recently in fashion. TCG is called collectable card game (CCG) in some foreign countries. In TCG, each player brings his/her collected cards, and enjoys the game in accordance with rules. A trading card arcade game (TCAG) including a combination of card and an electronic game console is now developed as an approach for making games to be more complicated and expanding variation of games.

In TCAG, unique information is embedded in the card, and the electronic game console reads the unique information embedded in the card, thereby a game or game development corresponding to the unique information is provided. TCAG therefore provides a player an experience as if individual cards have different functions. For example, the unique information may be embedded in the card by means of RFID (see PTL 1) or barcode.

CITATION LIST

Patent Literature

PTL 1: JP 2005-737111A

SUMMARY

Technical Problem

However, when unique information is simply embedded in a card, expansion of variation is inevitably limited by card types. Hence, further drastic complication of games has been disadvantageously not easy. Such limitation in expansion of variation by card types is also disadvantageous when a card is used for any application other than games.

It is desirable to provide a card enabling expansion of variation, an information processing unit and a recording medium having an information processing program capable of achieving information processing that expands variation using the card.

Solution to Problem

In an embodiment, a card is provided comprising an information setting unit configured to output a first signal including unique information of the card, and a bending sensor configured to output a second signal corresponding to a curvature of the card.

In another embodiment of the card, the curvature corresponds to at least one of a bending, a twisting, and a flipping of the card.

In an embodiment, an information processing apparatus is provided comprising a card reading unit configured to acquire information from a card, a processor, and a memory device. The memory device storing instructions which when executed by the processor, causes the processor to acquire unique information from the card, and acquire curvature information from the card corresponding to a curvature of the card.

In another embodiment of the information processing apparatus, the information processing apparatus further comprises a communication unit configured to communicate with a server. The instructions further cause the processor to acquire relevant information from the server corresponding to the unique information acquired from the card.

In another embodiment, a non-transitory computer readable storage medium storing a computer program is provided. The computer program is for causing an information processing apparatus including a card reading unit to acquire unique information from a card; and acquire curvature information from the card corresponding to a curvature of the card.

Advantageous Effects of Invention

According to the card of the above-described embodiment of the present technology, bending information and the unique information of the card are read from the inside of the card. Hence, variation is expanded using the bending information of the card.

According to the information processing unit and the recording medium having the information processing program of the above-described respective embodiments of the technology, the bending information and the unique information of the card are read from the inside of the card. Hence, variation is expanded using the bending information of the card.

It is to be understood that both the foregoing general description and the following detailed description are exemplary, and are intended to provide further explanation of the technology as claimed.

DESCRIPTION OF EMBODIMENT

Hereinafter, an embodiment of the present technology will be described in detail with reference to the accompanying drawings.

It is to be noted that description is made in the following order.

1. Embodiment
2. Modification

1. Embodiment

Figure 1:
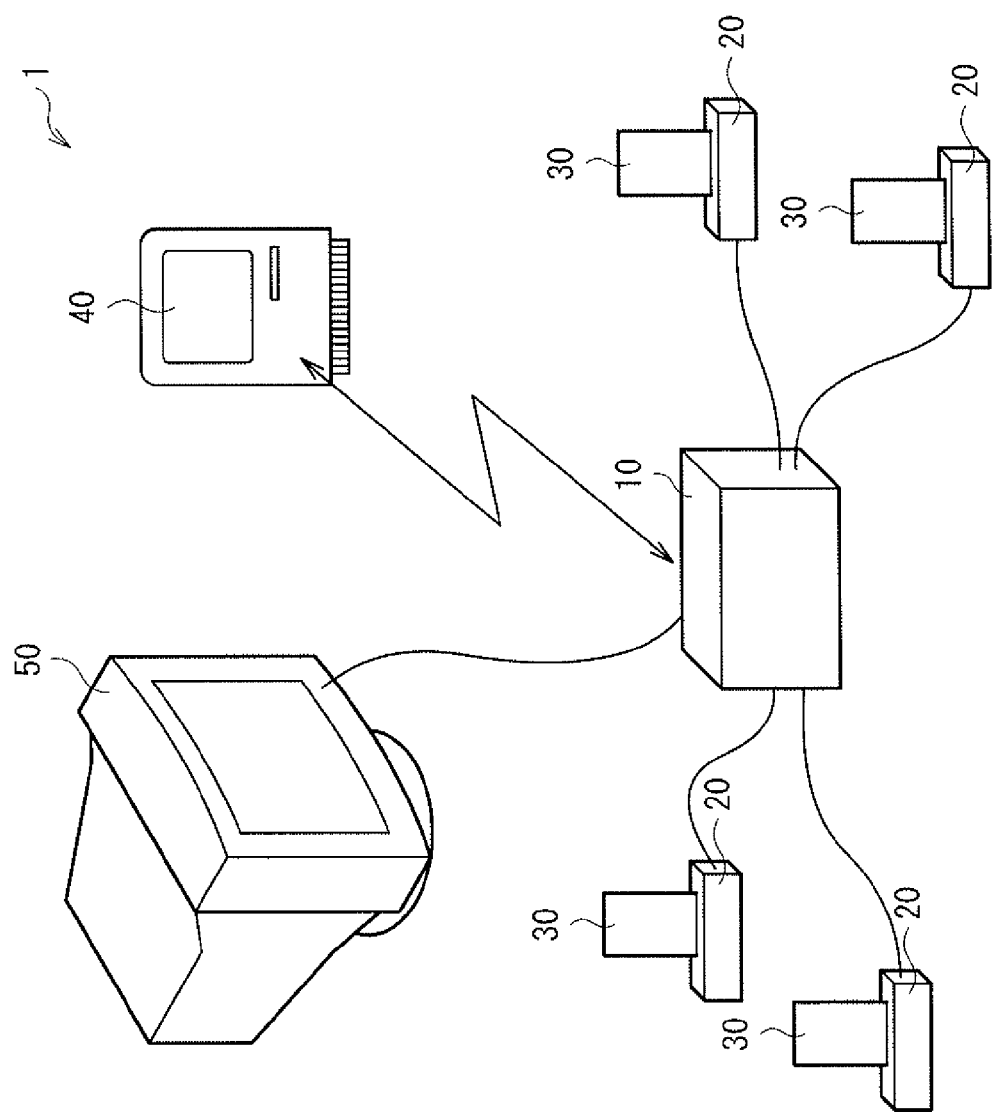
FIG. 1 is a schematic block diagram of an information processing network according to one embodiment of the present technology.

FIG. 1 illustrates a schematic configuration of an information processing network 1 according to one embodiment of the present technology. For example, the information processing network 1 may include an information processing unit 10, one or a plurality of connection sections 20 to be connected to the information processing unit 10 through wired or wireless connection, and one or a plurality of cards 30 that are each to be detachably connected to each of the connection sections 20. For example, the information processing unit 10 may be a home-use game console or an arcade game console placed in a video arcade or the like. The one or the plurality of connection sections 20 are provided separately from the information processing unit 10. Furthermore, for example, the information processing network 1 may include a server 40 that communicates with the information processing unit 10 over a network, and a display unit 50 that displays images based on image signals output from the information processing unit 10. For example, the network may be an external network such as Internet. The display unit 50 is provided separately from the information processing unit 10.

Figure 2:
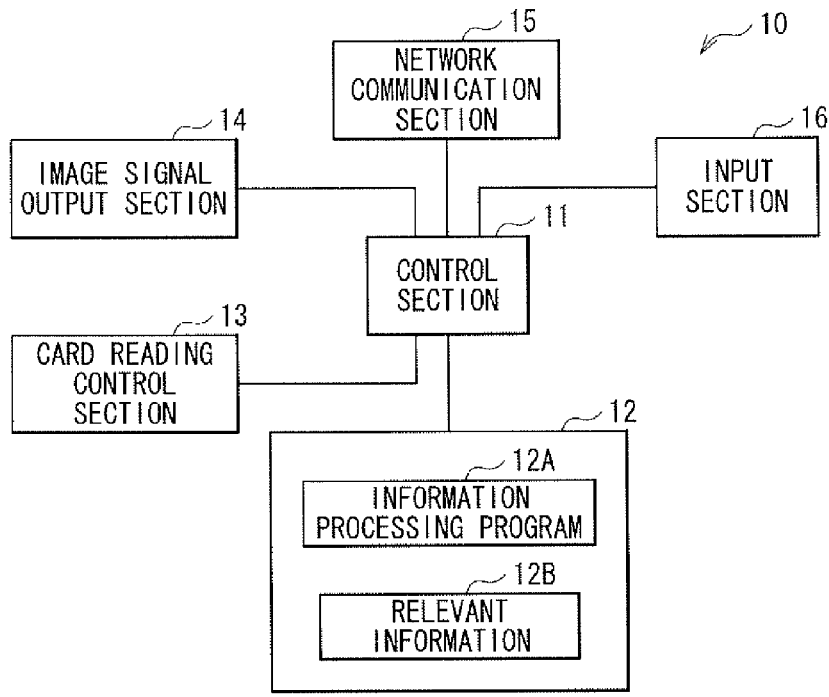
FIG. 2 is a view illustrating an exemplary functional block of an information processing unit in FIG. 1.

FIG. 2 illustrates an exemplary functional block of the information processing unit 10. For example, the information processing unit 10 may include a control section 11, a storage section 12, a card reading control section 13, an image signal output section 14, a network communication section 15, and an input section 16. The control section 11 is connected to each of the storage section 12, the card reading control section 13, the image signal output section 14, the network communication section 15, and the input section 16. The control section 11 corresponds to a specific but not limitative example of "read section" and "generation section" in one embodiment of the technology.

For example, the control section 11 may interpret and execute program instructions, and, for example, may be configured of a central processing unit (CPU). When an information processing program 12A is loaded into a predetermined area, the control section 11 interprets and executes the instructions of the loaded information processing program 12A.

The storage section 12 stores the information processing program 12A and relevant information 12B. The information processing program 12A instructs the control section 11 to perform a series of steps for, for example, playing a game. The series of steps for, for example, playing a game are described in detail later. The information processing program 12A may be beforehand stored in the storage section 12, or, for example, may be downloaded from the server 40 via the network communication section 15. The relevant information 12B is data used for the control section 11 to perform the series of steps for, for example, playing a game. For example, the relevant information 12B may be downloaded from the server 40 via the network communication section 15. The relevant information 12B is described in detail later.

Figure 3:
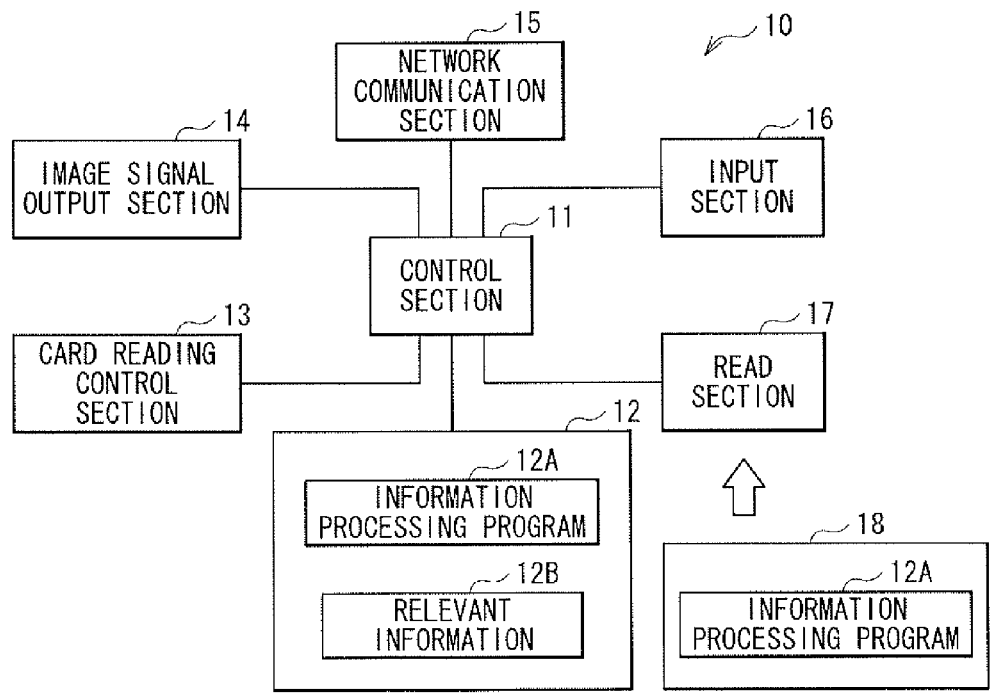
FIG. 3 is a view illustrating another exemplary functional block of the information processing unit in FIG. 1.

For example, as illustrated in FIG. 3, the information processing unit 10 may include a read section 17 that reads information from a recording medium 18. In the case where the recording medium 18 stores the information processing program 12A, the control section 11 controls the read section 17 to read the information processing program 12A contained in the recording medium 18, and controls the storage section 12 to store the information processing program 12A. Moreover, the control section 11 controls the read section 17 to read the information processing program 12A contained in the recording medium 18, and loads the information processing program 12A into a predetermined area so that the control section 11 interprets and executes the instructions of the loaded information processing program 12A.

The card reading control section 13 applies a predetermined voltage for reading information in the card 30 to the connection section 20 while acquiring the information in the card 30 via the connection section 20. The card reading control section 13 applies the predetermined voltage to the connection section 20 in response to a control signal (first control signal) from the control section 11, and accordingly acquires the information in the card 30 via the connection section 20. The first control signal is a signal to instruct the card reading control section 13 to apply the predetermined voltage for reading the information in the card 30 to the connection section 20.

For example, the image signal output section 14 may output an image signal specified by the control section 11 to the outside. In the case where the display unit 50 is connected to the information processing unit 10, the image signal output section 14 outputs the image signal to the display unit 50. The network communication section 15 communicates with an apparatus (for example, the server 40), which is connected to an external network such as Internet, over the external network in response to an instruction from the control section 11. The input section 16 is a unit for loading information from a user in a form of digital data into the information processing unit 10, and, for example, may be configured of a keyboard, a mouse, a remote controller, or a touch panel.

Figure 4:
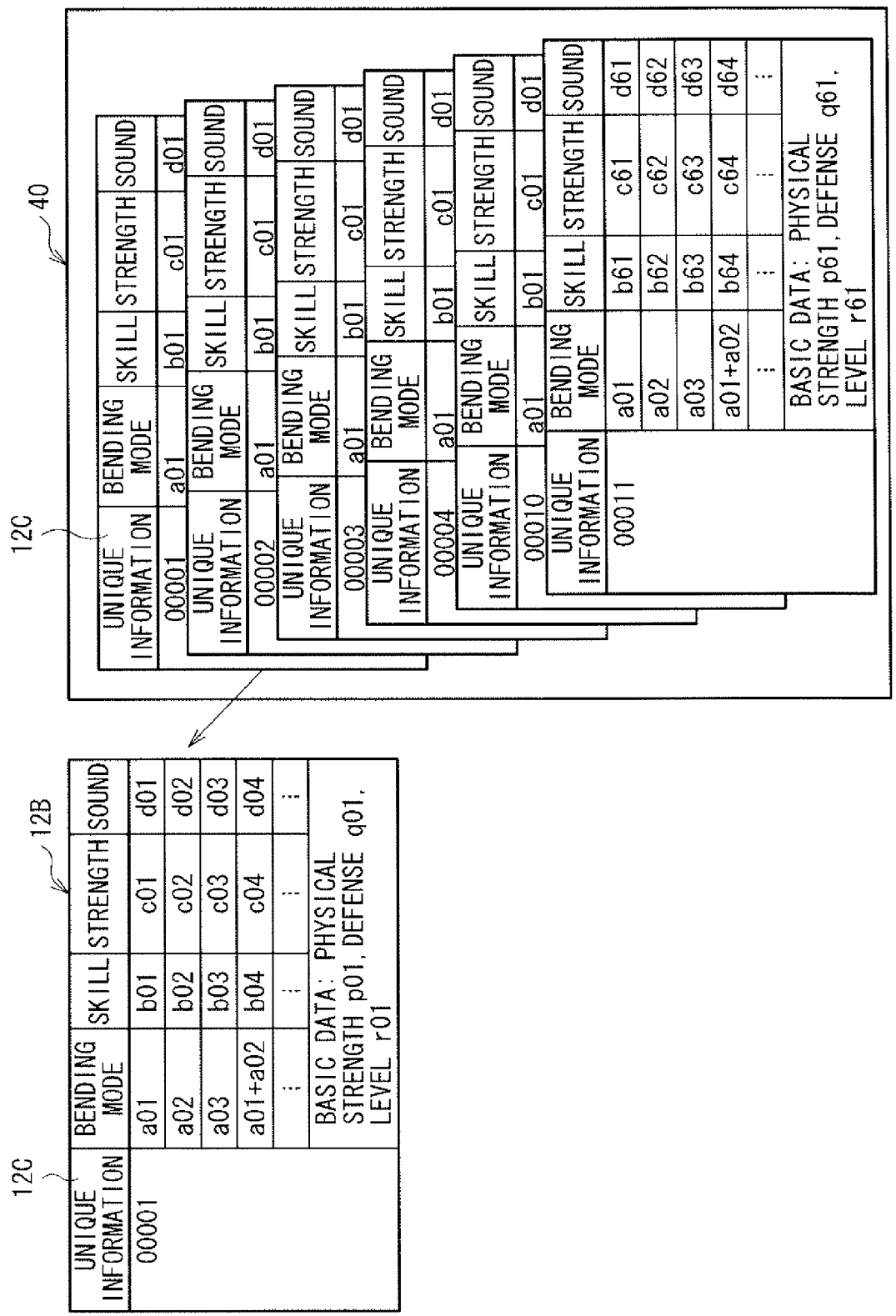
FIG. 4 is a view illustrating an example of relevant information in FIGS. 2 and 3.

The relevant information 12B is now described. FIG. 4 illustrates an example of the relevant information 12B. The relevant information 12B is information associated with one or a plurality of pieces of unique information 12C allocated for individual cards 30 or individual types of the card 30, and corresponds to a specific but not limitative example of "first relevant information" in one embodiment of the technology. Hereinafter, it is assumed that each of pieces of unique information 12C is allocated for each of the cards 30.

For example, as illustrated in FIG. 4, the unique information 12B may be represented by quinary numbers of plural bits. For example, the bit number may correspond to the number of switching interconnections in a switch SW described later. As schematically illustrated in the right of FIG. 4, the server 40 stores a large number of tables (pieces of relevant information 12B) that are each associated with each of the pieces of unique information 12C. The control section 11 acquires relevant information 12B corresponding to unique information 12C from the server 40 via the network communication section 15, and stores the relevant information 12B into the storage section 12 or in a predetermined region.

Figure 5A:
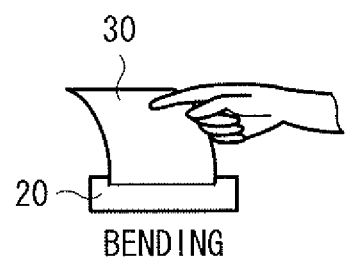
FIG. 5A is a view illustrating operation of "bending" of a card in FIG. 1.
Figure 5B:
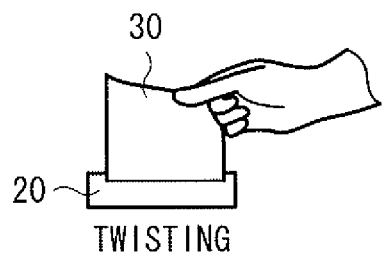
FIG. 5B is a view illustrating operation of "twisting" of the card in FIG. 1.
Figure 5C:
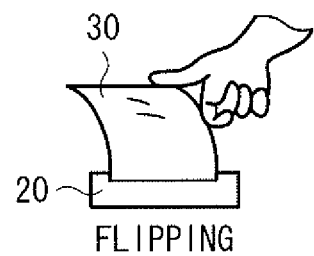
FIG. 5C is a view illustrating operation of "flipping" of the card in FIG. 1.

For example, the relevant information 12B may contain a bending mode of the card 30. For example, as illustrated in FIGS. 5A to 5C, the bending mode may refer to an action of a user on the card 30, such as "bending", "twisting", and "flipping". In the relevant information 12B, one or a plurality of parameters are associated with one bending mode. FIG. 4 exemplifies a case where three parameters, i.e., skill, strength, and sound, are associated with one bending mode. For example, when a user performs an action of "bending" on the card 30, the control section 11 determines such an action as input of one bending mode of "bending". As a result, the control section 11 reads one or a plurality of parameters associated with the one bending mode of "bending" from the relevant information 12B.

One or a plurality of parameters may also be associated with a plurality of bending modes being temporally consecutive. For example, in the case where a user performs an action of "bending" on the card 30 and then immediately performs an action of "twisting" thereon, the control section 11 determines such actions as input of two temporally consecutive bending modes of "bending" and "twisting". As a result, the control section 11 reads one or a plurality of parameters, which are associated with the two temporally consecutive bending modes of "bending" and "twisting", from the relevant information 12B. The one or the plurality of parameters, which are associated with the two temporally consecutive bending modes, correspond to a specific but not limitative example of "second relevant information" in one embodiment of the technology.

The relevant information 12B may contain data being not associated with the bending mode. The relevant information 12B may contain, for example, parameters indicating basic data of the unique information 12C, as such data. FIG. 4 exemplifies physical strength, defense, and level as such parameters. In the relevant information 12B, one or a plurality of parameters may be associated with intensity of the bending mode. For example, violent effective sound may be associated with a bending mode of strong "bending", and gentle effective sound may be associated with a bending mode of weak "bending".

Figure 6:
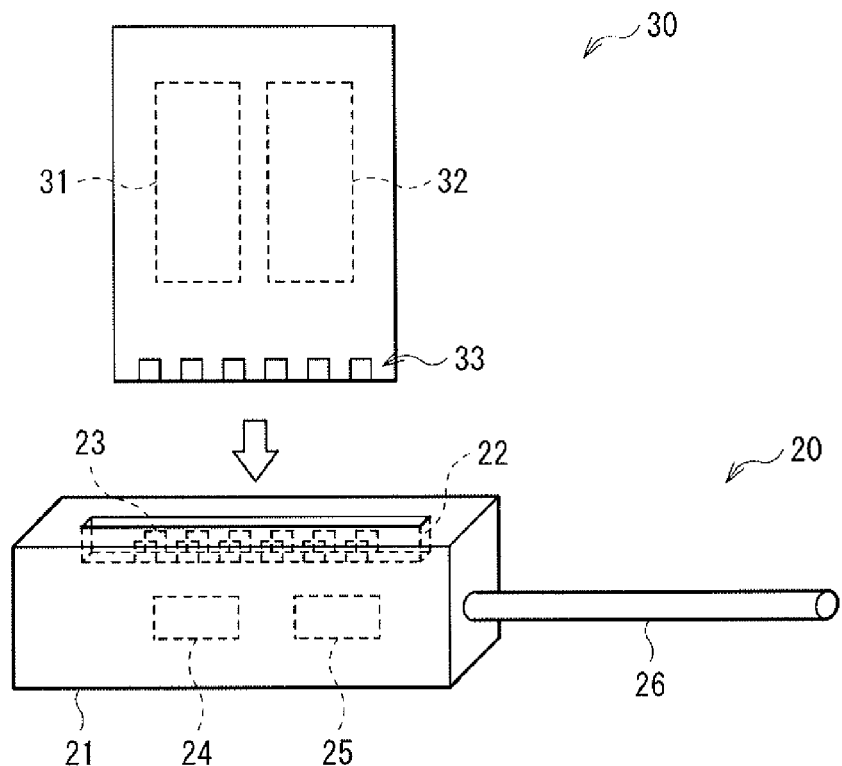
FIG. 6 is a view illustrating an exemplary configuration of each of a connection section and the card in FIG. 1.

FIG. 6 illustrates a schematic configuration of each of the card 30 and the connection section 20 to be detachably connected to the card 30. For example, the connection section 20 may include a slot 22 to introduce the card 30, a card holding section 21 that holds the card 30 through the slot 22, and a plurality of electrodes 23 that are provided in the slot 22 and are to be in contact with a plurality of electrodes 33 of the card 30. The slot 22 is a cavity having a shape (for example, an elongated rectangular shape) corresponding to a shape of one side of the card 30, and, for example, may be provided on a top of the card holding section 21. The electrodes 23 are arranged in a line or in two lines with a predetermined space therebetween. Here, "predetermined space" refers to a gap that is large enough for the electrodes 33 of the card 30 to be fit therein. In the case where the electrodes 23 are arranged in a line, for example, the inner surface of the slot 22 may be disposed at a distance corresponding to "predetermined space" from the electrodes 23. Alternatively, in the case where the electrodes 23 are arranged in a line, for example, each electrode may have a letter U-shape having "predetermined space".

For example, the connection section 20 may further include an ID read circuit 24 and a bending information read circuit 25. For example, the ID read circuit 24 and the bending information read circuit 25 may be provided in the inside of the card holding section 21 while being electrically connected to the electrodes 23. In the case where the connection section 20 is connected to the information processing unit 10 through wired connection, the connection section 20 has a cable 26.

For example, the card 30 may be a playing-card size card commonly used in card games. For example, the card 30 may include a unique information setting circuit 31, a bending sensor 32, and the electrodes 33. The unique information setting circuit 31 outputs a voltage corresponding to the unique information 12B of the card 30 in response to a voltage applied from the outside (the connection section 20). The bending sensor 32 generates a voltage corresponding to a mode of bending of the card 30. The unique information setting circuit 31 and the bending sensor 32 are described in detail later. The card 30 has no function of displaying images in response to any appropriate signal, and has no power supply that supplies power to each of components in the card 30.

The electrodes 33 are provided side by side in a line along an end edge of the card 30 on one end of the card 30, and are provided on one or both of the surface 30A and the back 30B of the card 30. For example, in the case where a picture common to all the cards 30 is drawn on the entire surface 30A while information and a picture unique to an individual card 30 are drawn on the back 30B, the electrodes 33 is provided on the surface 30A or on both the surface 30A and the back 30B. In the case where the electrodes 33 are provided on only one side of the card 30, the electrodes 23 of the connection section 20 are arranged in the slot 22 in one or more line. In the case where the electrodes 33 are provided on both the surface 30A and the back 30B, the electrodes 23 of the connection section 20 are arranged in the slot 22 in two lines with "predetermined space" therebetween, or each electrode has a letter U-shape having "predetermined space".

Figure 7A:
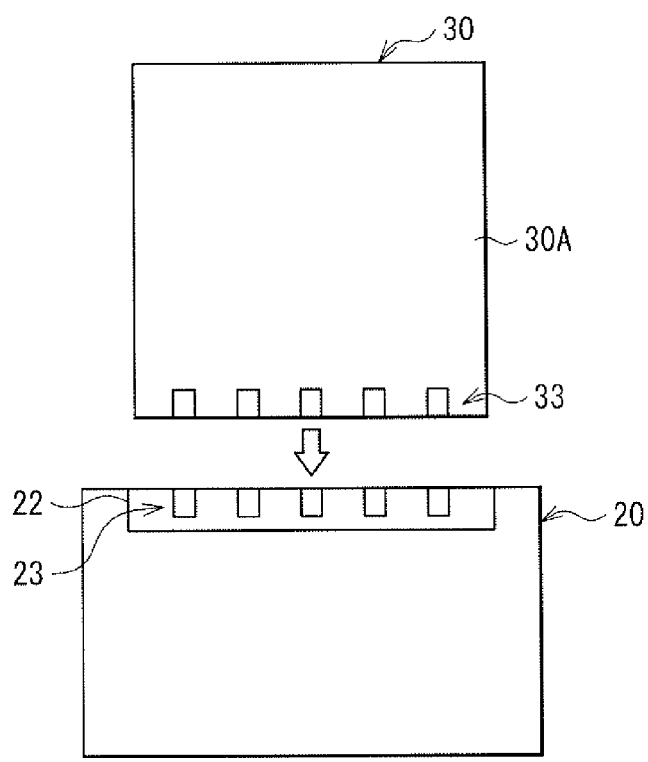
FIG. 7A is a view illustrating an exemplary positional relationship on a front side between electrodes of the card and electrodes of the connection section in FIG. 6.
Figure 7B:
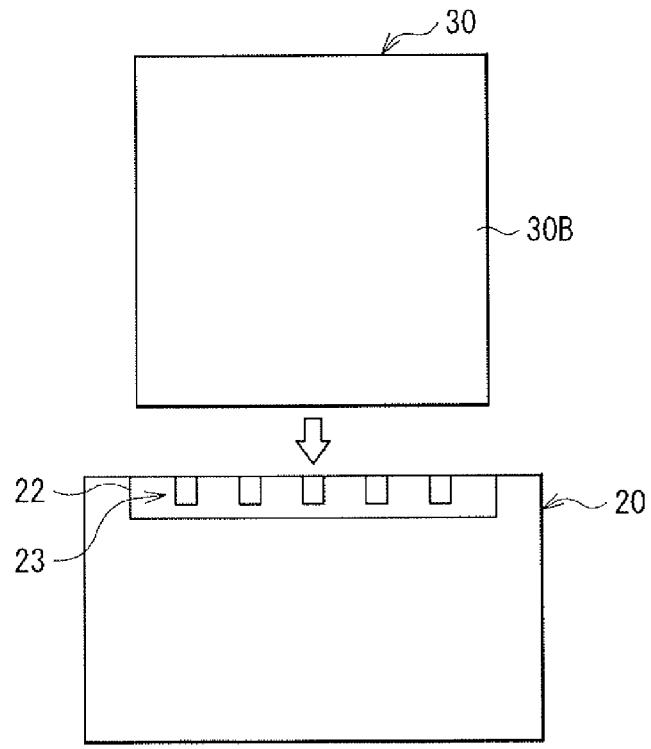
FIG. 7B is a view illustrating an exemplary positional relationship on a back side between the electrodes of the card and the electrodes of the connection section in FIG. 6.

For example, as illustrated in FIGS. 7A and 7B, in the case where the electrodes 33 are provided only on the surface 30A, and formation positions of the electrodes 33 of the card 30 correspond to formation positions of the electrodes 23 of the connection section 20, respectively, the electrodes 23 may be preferably arranged in a line only on one side face in the slot 22. In this case, when the card 30 is inserted inside out, any electrode 33 of the card 30 is not in contact with any of the electrodes 23 of the connection section 20; hence, the information in the card 30 is prevented from being falsely recognized by the connection section 20.

Figure 8A:
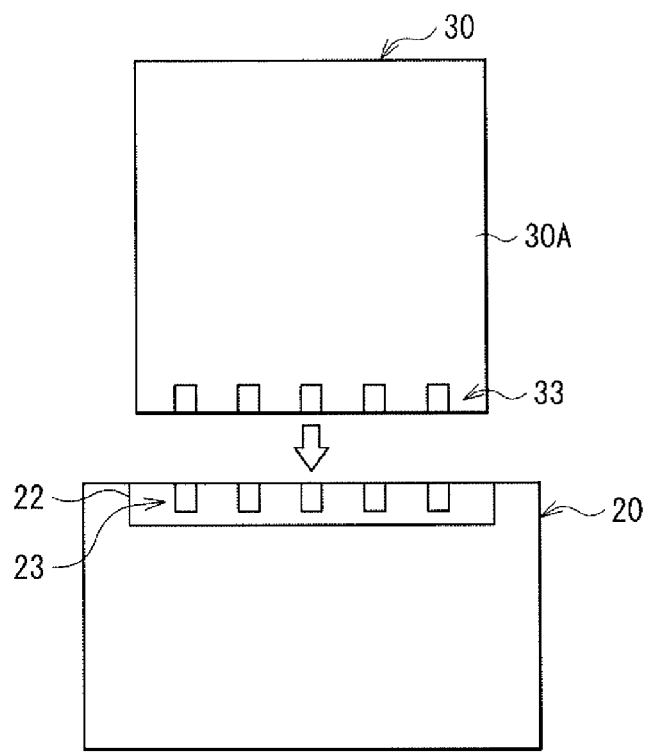
FIG. 8A is a view illustrating another exemplary positional relationship on the front side between the electrodes of the card and the electrodes of the connection section in FIG. 6.
Figure 8B:
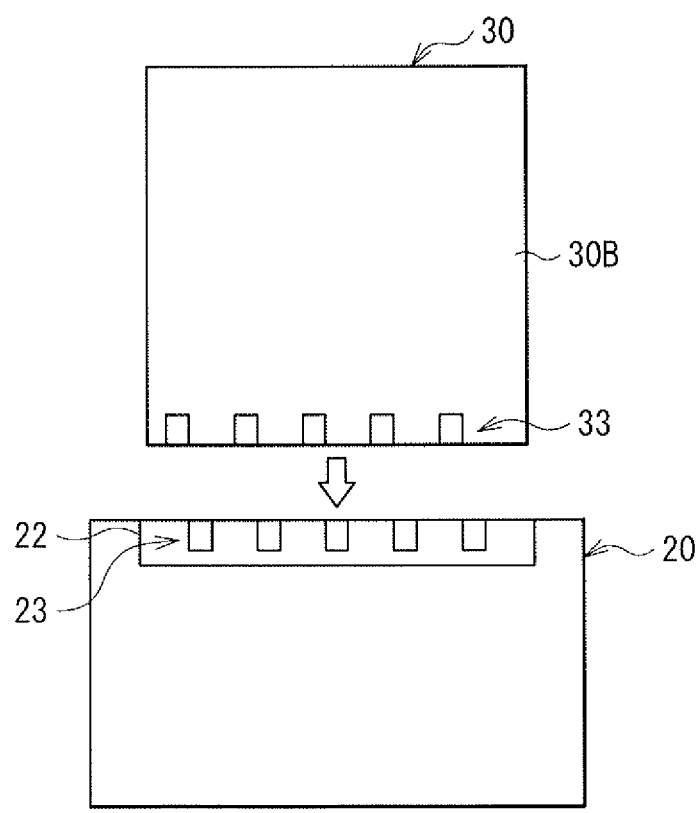
FIG. 8B is a view illustrating another exemplary positional relationship on the back side between the electrodes of the card and the electrodes of the connection section in FIG. 6.

For example, as illustrated in FIGS. 8A and 8B, in the case where the electrodes 33 are provided on both the surface 30A and the back 30B, it is preferable that any of formation positions of the electrodes 33 of the card 30 do not correspond to any of formation positions of the electrodes 23 of the connection section 20. For example, the formation positions of the electrodes 33 of the card 30 and the formation positions of the electrodes 23 of the connection section 20 may be preferably disposed in a staggered configuration. In this case, when the card 30 is inserted inside out, any electrode 33 of the card 30 is also not in contact with any of the electrodes 23 of the connection section 20; hence, the information in the card 30 is prevented from being falsely recognized by the connection section 20.

Figure 9:
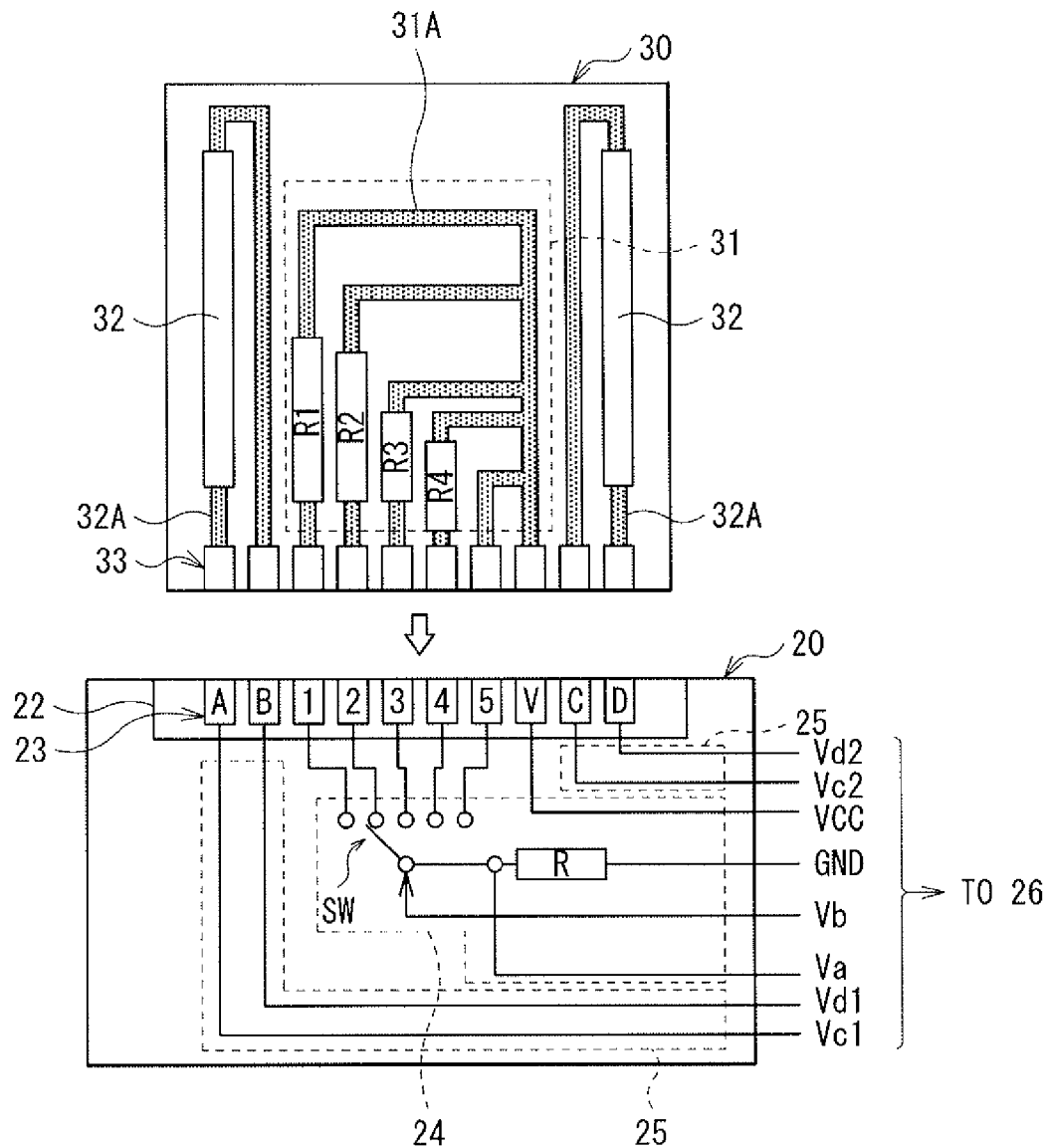
FIG. 9 is a view illustrating one Modification of the configuration of each of the connection section and the card in FIG. 1.

FIG. 9 illustrates an exemplary internal configuration of each of the connection section 20 and the card 30. In the connection section 20, for example, the ID read circuit 24 may include a VCC line, a Multiple-Input/Single-Output switch SW, a resistance R, and an ID detection line. The resistance R and the ID detection line are connected in parallel to an output side of the switch SW. The respective electrodes 23 (1, 2, 3, 4, and 5 in FIG. 9) are connected to an input side of the switch SW for individual input terminals of the switch SW. For example, the ID read circuit 24 may supply a predetermined voltage to the card 30 through the VCC line, and may allow the switch SW to perform switching operation in response to a control signal from the card reading control section 13. As a result, the ID read circuit 24 converts a plurality of voltages (parallel data) output from the electrodes 23 (1, 2, 3, 4, and 5 in FIG. 9) into a serial voltage Va (serial data), and outputs the voltage Va to the ID detection line. For example, the card reading control section 13 may convert the analog voltage Va acquired from the ID read circuit 24 into a digital voltage Va', and outputs the voltage Va' to the control section 11. Consequently, for example, the control section 11 may read the unique information 12C of the card 30 from the voltage Va' (second signal) acquired via the card reading control section 13 and the connection section 20. The bending information read circuit 25 is provided for each bending sensor 32 described later. For example, the bending information read circuit 25 may have two interconnections connected to two respective electrodes (A and B or C and D in FIG. 9) to be electrically connected to one bending sensor 32. For example, the bending information read circuit 25 may output two voltages Vc1 and Vd1, which are sent from two electrodes 23 corresponding to A and B in FIG. 9, to the card reading control section 13 through the two interconnections. Similarly, for example, the bending information read circuit 25 may output two voltages Vc2 and Vd2, which are sent from two electrodes 23 corresponding to C and D in FIG. 9, to the card reading control section 13 through the two interconnections. For example, the card reading control section 13 may convert a potential difference (=Vc1−Vd1) between the two analog voltages Vc1 and Vd1, which are acquired from the bending information read circuit 25, into a digital voltage deltaV1, and outputs the voltage deltaV1 to the control section 11. Similarly, for example, the card reading control section 13 may convert a potential difference (=Vc2−Vd2) between the two analog voltages Vc2 and Vd2, which are acquired from the bending information read circuit 25, into a digital voltage deltaV2, and outputs the voltage deltaV2 to the control section 11. Consequently, for example, the control section 11 may read the bending mode of the card 30 from the voltage deltaV1 or deltaV2 (first signal) acquired via the card reading control section 13 and the connection section 20.

In the card 30, for example, the unique information setting circuit 31 may have a circuit configuration where respective interconnections 31A having different interconnection resistance values are provided for the respective electrodes 23 connected to an input side of the switch SW. For example, the unique information setting circuit 31 may include interconnections 31A for resistances R1, R2, R3, and R4 and interconnections 32A having no resistance. The respective interconnections 31A are connected at one ends thereof to individual electrodes 33, and are connected at the other end thereof to a common electrode 33. Specifically, for example, the unique information setting circuit 31 may include a parallel circuit including the interconnections 31A (circuit blocks) that have interconnection resistance values different from one another and are disposed in parallel. Here, it is assumed that "A" types of resistances are prepared, and appropriate resistance values are selected from values of the "A" types of resistances to produce an "X" digit sequence. At this time, (A+1) to the power of "X" pieces of unique information are produced in consideration of the resistance value of zero.

The unique information setting circuit 31 is configured of a printing pattern formed through printing on a substrate 34. Specifically, all of the interconnections 31A and the resistances R1, R2, R3, and R4 are formed by printing. The interconnections 31A may be formed by printing a conductive paste by screen printing or offset printing. The resistances R1, R2, R3, and R4 may be formed by printing a resistor paste by screen printing or offset printing.

The bending sensor 32 is disposed parallel to one substrate (first substrate) contained in the card 30, or disposed parallel to one substrate (first substrate) of a plurality of substrates contained in the card 30. An interconnection 32A (first interconnection) is electrically connected to the top of the bending sensor 32, and another interconnection 32A (second interconnection) is electrically connected to the bottom of the bending sensor 32. The two respective interconnections 32A connected to the top and the bottom are connected to respective different electrodes 33.

Figure 10:
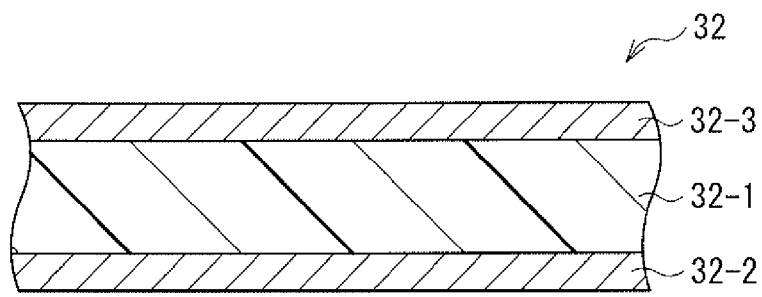
FIG. 10 is a view illustrating an exemplary sectional configuration of a bending sensor in FIG. 9.

The bending sensor 32 outputs a signal (first signal) correlative to curvature of the substrate contained in the card 30. The bending sensor 32 is a device that curves along with the curvature of the substrate contained in the card 30, and thus generates a potential difference between the top and the bottom of the bending sensor 32. Hence, the bending sensor 32 is not necessary to receive supply of an operating current. For example, as illustrated in FIG. 10, the bending sensor 32 may preferably be an electroactive polymer (EAP) device in which the respective sides of a polymer compound film 32-1 are overlaid by electrode films 32-2 and 32-3. In the EAP device illustrated in FIG. 10, a voltage correlative to a bending direction or a bending level is output; hence, in the case where such an EAP device is provided as the bending sensor 32 in the card 30, a voltage correlative to the bending direction or the bending level of the card 30 is output from the bending sensor 32.

For example, the polymer compound film 32-1 may be configured of an ion conductive resin sheet having a thickness of about 0.1 mm to 0.2 mm both inclusive. For example, each of the electrode films 32-2 and 32-3 may be configured of a metal-evaporated film having a thickness of about 40 nm. For example, each of the electrode films 32-2 and 32-3 may also be formed by application of a mixture of granular conductive carbon powder with ion conductive resin. When the ion conductive resin is bent, distribution of ions therein becomes uneven, leading to generation of a potential difference between the electrodes.

Figure 11:
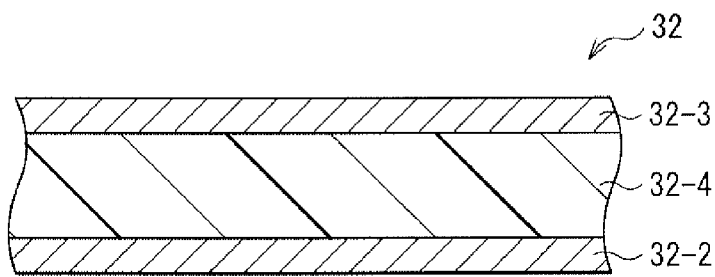
FIG. 11 is a view illustrating another exemplary sectional configuration of the bending sensor in FIG. 9.

Hydrogen ions, sodium ions, lithium ions, or the like are appropriately selected as operating ions. In the case where hydrogen ions are used, the ion conductive resin is immersed in a sulfuric acid aqueous solution, thereby movable ions in the ion conductive resin are substituted by hydrogen ions. In the case where sodium ions are used, the ion conductive resin may be preferably immersed in a saline solution. In the case where lithium ions are used, the device may be preferably immersed in a lithium chloride solution. When bending stress is applied to the ion conductive resin, the operating ions migrate from an inner side to an outer side of bending. If positive ions are used as the operating ions, the positive ions are densely distributed on the outer side of the device. As a result, any electrode on an outer side has an increased electric potential. If the ion conductive resin is bent in an opposite direction, an electrode on an opposite side has an increased electric potential, thereby making it possible to detect a bending direction. Also, when the bending level increases, unevenness of ion distribution also increases, resulting in an increase in potential difference between the two electrodes. In this way, the potential difference between the two electrodes on the two sides is detected, thereby making it possible to detect the bending direction and the bending level together. In existing bending sensors (such as a strain gage and a pressure-sensitive rubber) based on variations in resistance, the bending direction has not been detected, leading to limitation in operation. In addition, a current is necessary to be applied to the sensor itself to operate the sensor. In contrast, it is not necessary for the ion conductive resin to receive current application from the outside, and the ion conductive resin detects the bending direction through reversal of polarity of output voltage. This enables different responses of the control section 11 between front-side bending and back-side bending, thereby allowing more complicated operation. The ion conductive resin is further characterized in that if the ion conductive resin is continuously bent at a constant level, an accurate bending level of the resin is also continuously detected. Hence, the ion conductive resin is particularly useful when certain operation is continuously performed for a fixed period. Existing sensors based on a piezoelectric effect (piezoelectric devices) only detect temporal variations of a bending level. Nevertheless, in examples where obtaining only temporal variations of a bending level is enough, the bending sensor 32 may be a piezoelectric device in which two respective sides of a piezoelectric body 32-4 are overlaid by the electrode films 32-2 and 32-3, for example, as illustrated in FIG. 11.

For example, the bending sensor 32 may be provided in the card 30 by pasting. On the other hand, the interconnections 32A to be connected to the bending sensor 32 may be formed by printing. The interconnections 32A may be formed by printing a conductive paste by screen printing or offset printing as with the interconnections 31A.

Figure 12A:
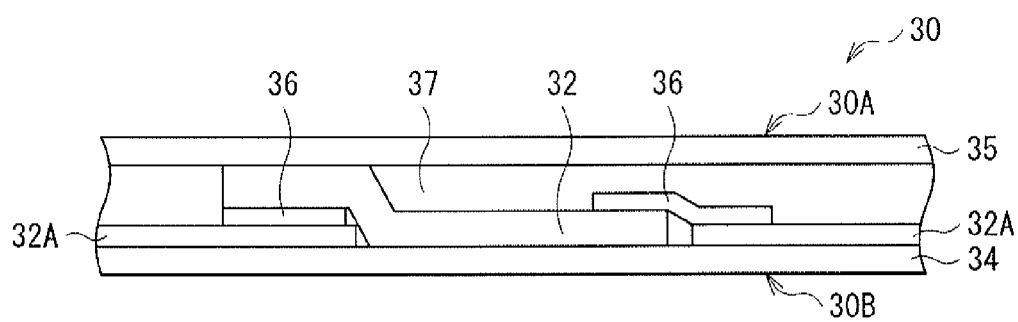
FIG. 12A is a view illustrating an exemplary sectional configuration of the bending sensor together with the neighborhood thereof in the card in FIG. 9.
Figure 12B:
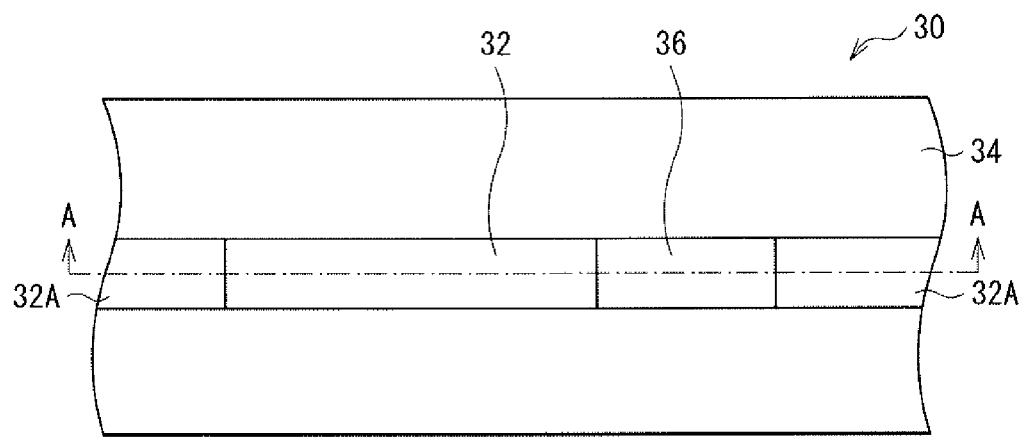
FIG. 12B is a view illustrating an exemplary planar configuration of the bending sensor together with the neighborhood thereof in the card in FIG. 9.
Figure 13A:
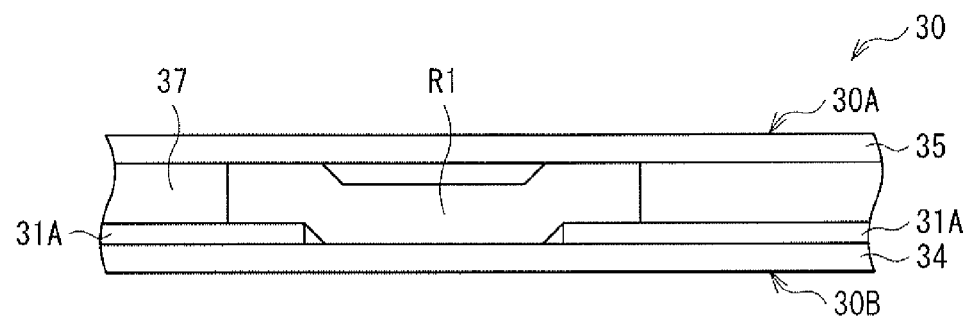
FIG. 13A is a view illustrating an exemplary sectional configuration of a resistance together with the neighborhood thereof in the card in FIG. 9.
Figure 13B:
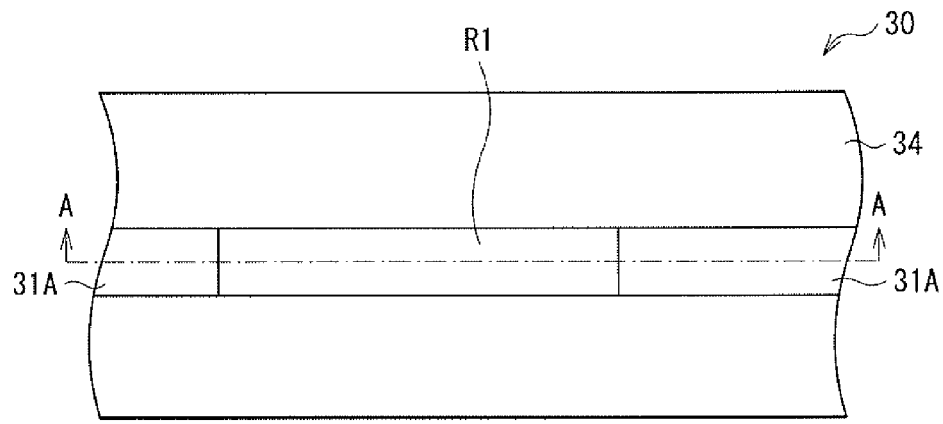
FIG. 13B is a view illustrating an exemplary planar configuration of the resistance together with the neighborhood thereof in the card in FIG. 9.

FIG. 12A illustrates an exemplary sectional configuration of the bending sensor 32 together with the neighborhood thereof in the card 30. FIG. 12B illustrates an exemplary top configuration of the bending sensor 32. FIG. 13A illustrates an exemplary sectional configuration of the resistance R1 together with the neighborhood thereof in the unique information setting circuit 31 in the card 30. FIG. 13B illustrates an exemplary top configuration of the resistance R1.

The card 30 includes one or a plurality of bending sensors 32 and the unique information setting circuit 31 between two substrates 34 and 35. Specifically, the one or the plurality of bending sensors 32 and the unique information setting circuit 31 are provided in the same layer. For example, the one or the plurality of bending sensors 32 and the unique information setting circuit 31 may be provided on a common substrate (specifically, the substrate 34). The one or the plurality of bending sensors 32 and the unique information setting circuit 31 may be provided on respective different substrates as long as they are provided in the same layer.

For example, as illustrated in FIGS. 12A and 12B, the bending sensor 32 may have a belt-like shape. The bending sensor 32 has a belt-like shape, which increases detection sensitivity on bending, twisting, and flipping etc. of the card 30 (or the substrate 34 or 35). An interconnection 32A is electrically connected to the bottom on one end side of the bending sensor 32 through a conductive adhesive agent 36 (or a conductive tape, ACF etc.). Furthermore, another interconnection 32A is electrically connected to the top on the other end side of the bending sensor 32 through a conductive adhesive agent 36 (or a conductive tape, ACF etc.).

For example, as illustrated in FIGS. 13A and 13B, the resistance R1 may have a belt-like shape. For example, each of the resistances R2, R3, and R4 may also have a belt-like shape as with the resistance R1. Each of the resistances R1, R2, R3, and R4 has a belt-like shape, thereby the resistances R1, R2, R3, and R4 easily have resistance values different from one another by variously adjusting the length or width of each of the resistances R1, R2, R3, and R4. The resistances R1, R2, R3, and R4 may also have resistance values different from one another by variously adjusting the thickness of each of the resistances R1, R2, R3, and R4. An interconnection 31A is directly in contact with one end side of the bottom of each of the resistances R1, R2, R3, and R4. Furthermore, another interconnection 31A is directly in contact with the other end side of the bottom of each of the resistances R1, R2, R3, and R4.

Figure 14A:
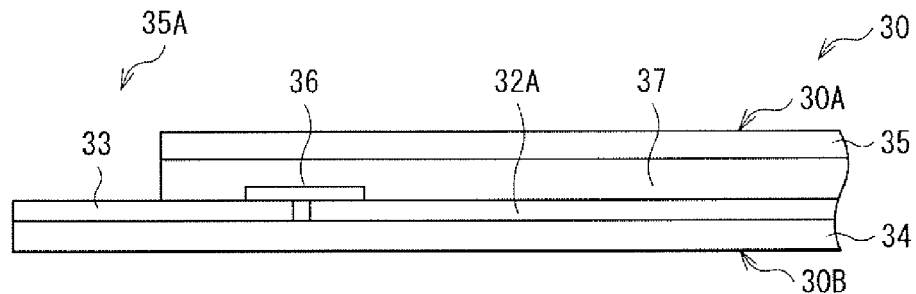
FIG. 14A is a view illustrating an exemplary sectional configuration of an electrode together with the neighborhood thereof in the card in FIG. 9.
Figure 14B:
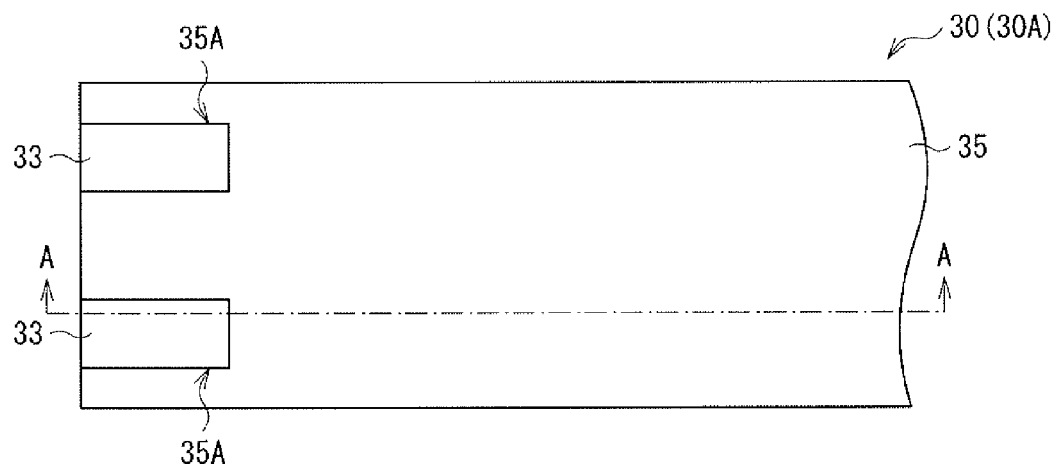
FIG. 14B is a view illustrating an exemplary planer configuration of the electrode together with the neighborhood thereof in the card in FIG. 9.

FIG. 14A illustrates an exemplary sectional configuration of the electrode 33 together with the neighborhood thereof in the card 30. FIG. 14B illustrates an exemplary top configuration of the electrode 33. Each electrode 33 is provided in contact with the inner surface (surface on a side close to the substrate 35) of the substrate 34 on which the interconnections 31A and 32A are provided. Each electrode 33 is disposed on an end edge of the substrate 34. The electrodes 33 are arranged in a line along an end edge of one side of the substrate 34. A part of the electrodes 33 (a first terminal and a second terminal) are each electrically connected to the interconnection 32A through a conductive adhesive agent 36 (or a conductive tape, ACF etc.) Another part of the electrodes 33 (third terminals) are each electrically connected to the interconnection 31A through a conductive adhesive agent 36 (or a conductive tape, ACF etc.)

Figure 15A:
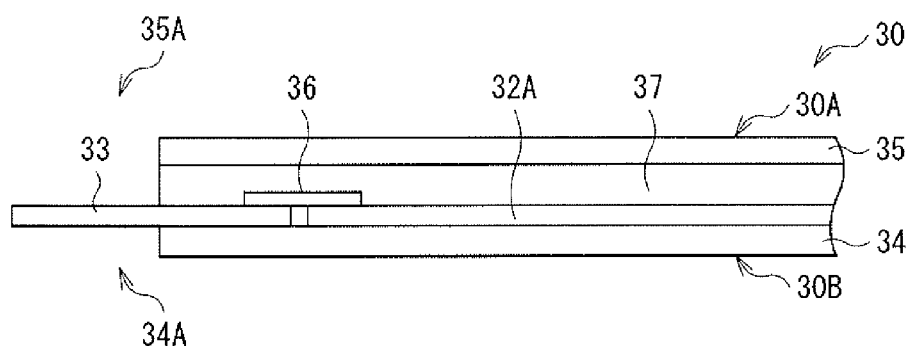
FIG. 15A is a view illustrating another exemplary sectional configuration of the electrode together with the neighborhood thereof in the card illustrated in FIG. 9.
Figure 15B:
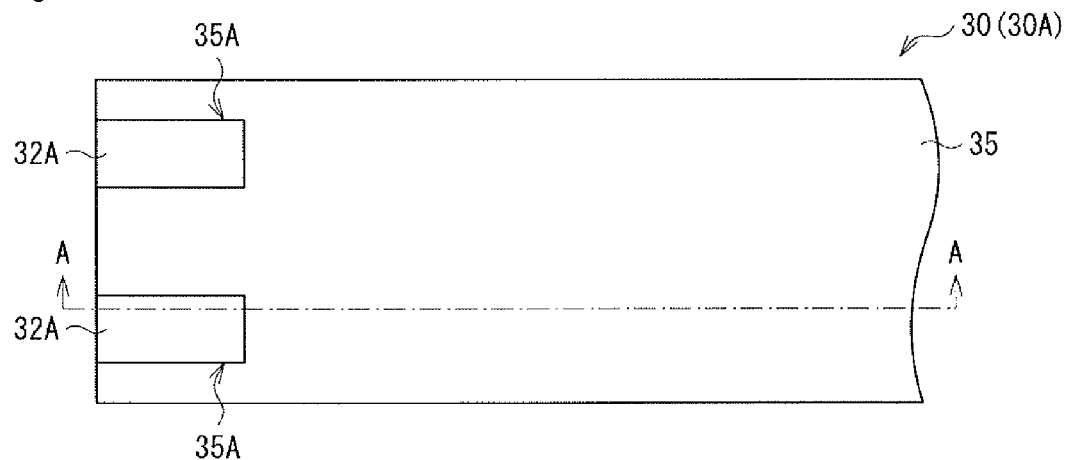
FIG. 15B is a view illustrating another exemplary planar configuration of the electrode together with the neighborhood thereof in the card in FIG. 9.

For example, as illustrated in FIG. 14B, the substrate 35 may have a cutout 35A in each portion opposed to each electrode 33. As a result, one side of each electrode 33 has a surface exposed to the outside. Furthermore, for example, as illustrated in FIGS. 15A and 15B, the substrate 34 may also have a cutout 34A in each portion opposed to each electrode 33. In such a case, two respective sides of each electrode 33 have surfaces exposed to the outside.

Figure 16:
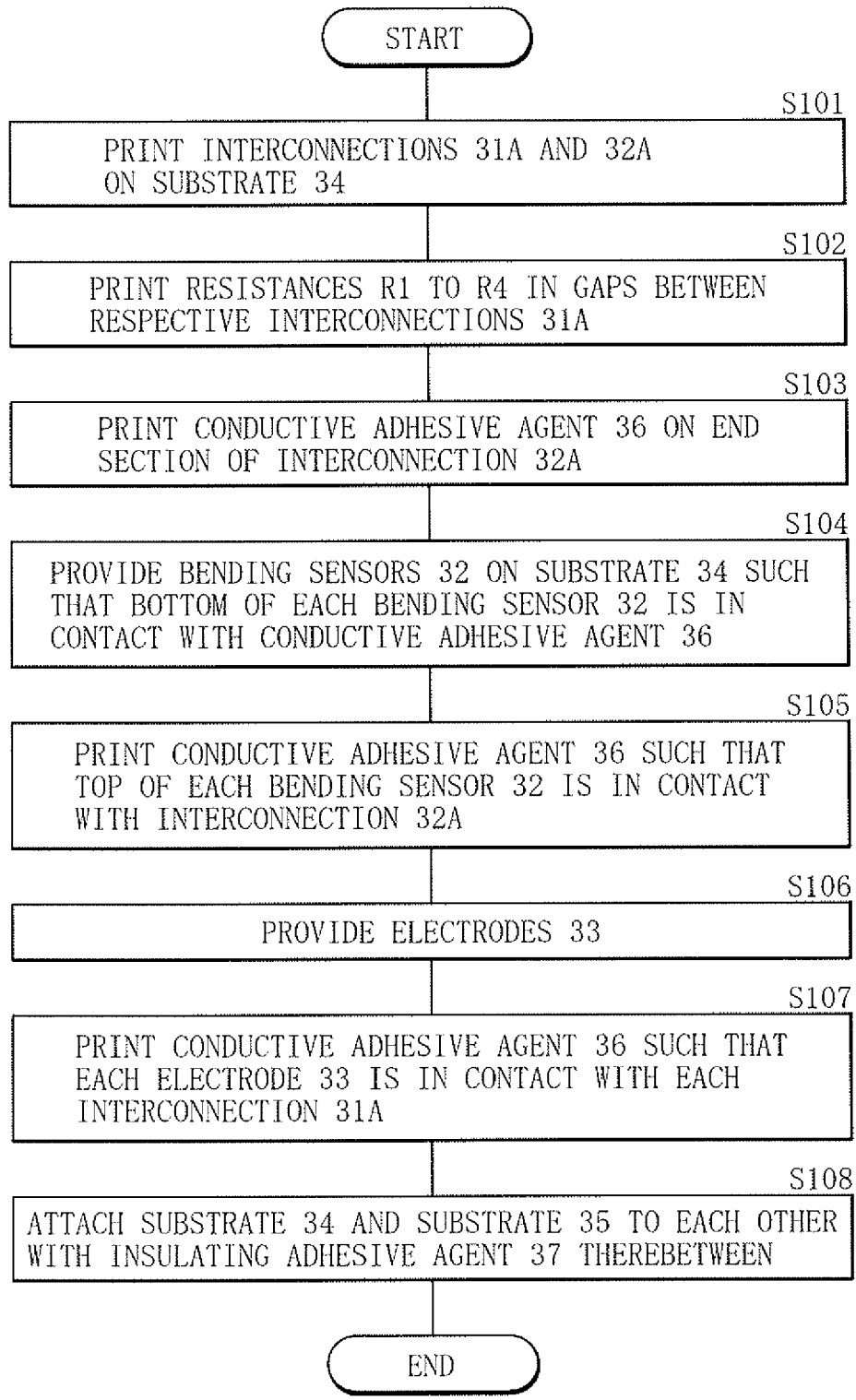
FIG. 16 is a flowchart illustrating an exemplary method of manufacturing the card in FIG. 9.
Figure 17A:
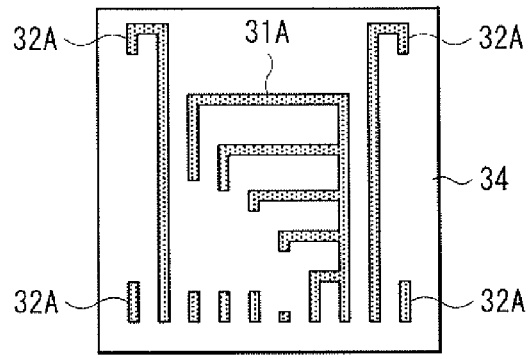
FIG. 17A is a plan view illustrating an exemplary manufacturing step of the card in FIG. 9.
Figure 17B:
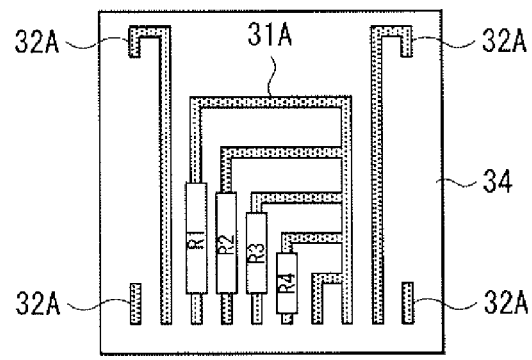
FIG. 17B is a view illustrating an exemplary manufacturing step following FIG. 17A.

An exemplary method of manufacturing the card 30 is now described. FIG. 16 is a flowchart illustrating an exemplary manufacturing procedure of the card 30. FIGS. 17A to 17D and FIGS. 18A to 18D are plan views illustrating manufacturing steps of the card 30 in order. First, a plurality of interconnections 31A and 32A are printed on the substrate 34 (step S101) (FIG. 17A). For example, the interconnections 31A and 32A may be printed together by printing a conductive paste by screen printing or offset printing. Then, the resistances R1 to R4 are printed in respective gaps between the interconnections 31A (step S102) (FIG. 17B). At this time, the resistances R1 to R4 are printed by printing a resistor paste by screen printing or offset printing.

Figure 17C:
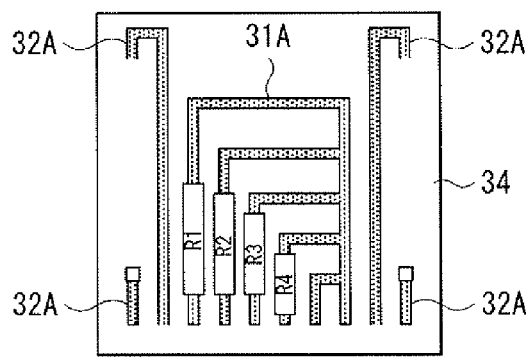
FIG. 17C is a view illustrating an exemplary manufacturing step following FIG. 17B.
Figure 17D:
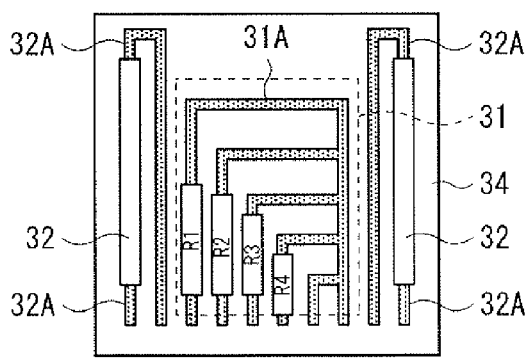
FIG. 17D is a view illustrating an exemplary manufacturing step following FIG. 17C.
Figure 18A:
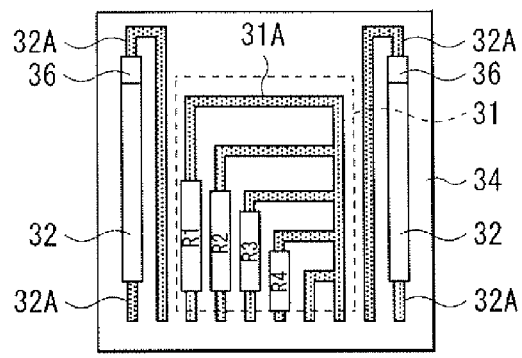
FIG. 18A is a view illustrating an exemplary manufacturing step following FIG. 17D.

Then, the conductive adhesive agent 36 is printed on an end section of each interconnection 32A (step S103) (FIG. 17C). At this time, a conductive tape, ACF, or the like may be used in place of the conductive adhesive agent 36. Then, one or plurality of bending sensors 32 are provided on the substrate 34 such that the bottom of each bending sensor 32 is in contact with the conductive adhesive agent 36 (step S104) (FIG. 17D). For example, the bending sensor 32 may be provided by a transfer process. Then, the conductive adhesive agent 36 is printed such that the top of the bending sensor 32 is in contact with the interconnection 32A (step S105) (FIG. 18A). At this time, a conductive tape, ACF, or the like may be used in place of the conductive adhesive agent 36.

Figure 18B:
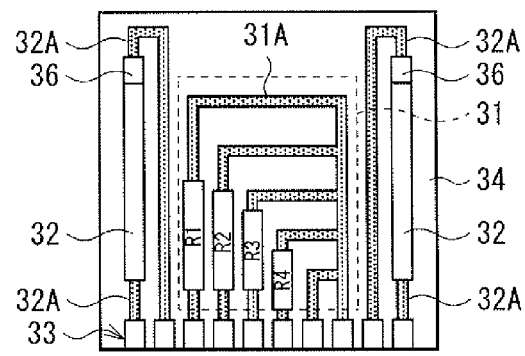
FIG. 18B is a view illustrating an exemplary manufacturing step following FIG. 18A.
Figure 18C:
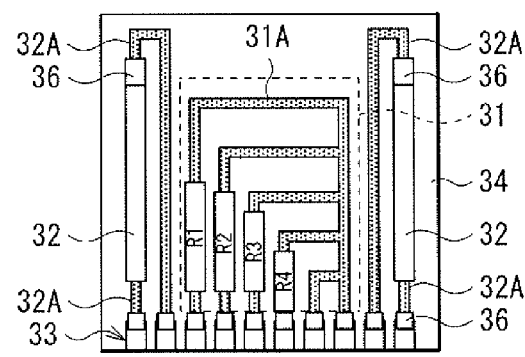
FIG. 18C is a view illustrating an exemplary manufacturing step following FIG. 18B.
Figure 18D:
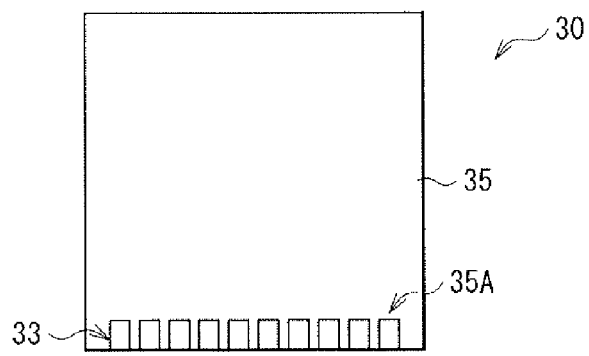
FIG. 18D is a view illustrating an exemplary manufacturing step following FIG. 18C.

Then, a plurality of electrodes 33 are provided (step S106) (FIG. 18B). For example, the electrodes 33 may be provided by a transfer process. Then, the conductive adhesive agent 36 is printed such that the top of each electrode 33 is in contact with each of the interconnections 32A and 31A (step S107) (FIG. 18C). At this time, a conductive tape, ACF, or the like may be used in place of the conductive adhesive agent 36. Finally, an insulating adhesive agent 37 is printed on the entire top other than surfaces of the electrodes 33, and then the substrate 34 and the substrate 35 having the cutouts 35A are attached to each other with the insulating adhesive agent 37 (the one or the plurality of bending sensors 32, the resistances R1 to R4, and the like) therebetween (step S108) (FIG. 18D). In this way, the card 30 may be manufactured.

Figure 19:
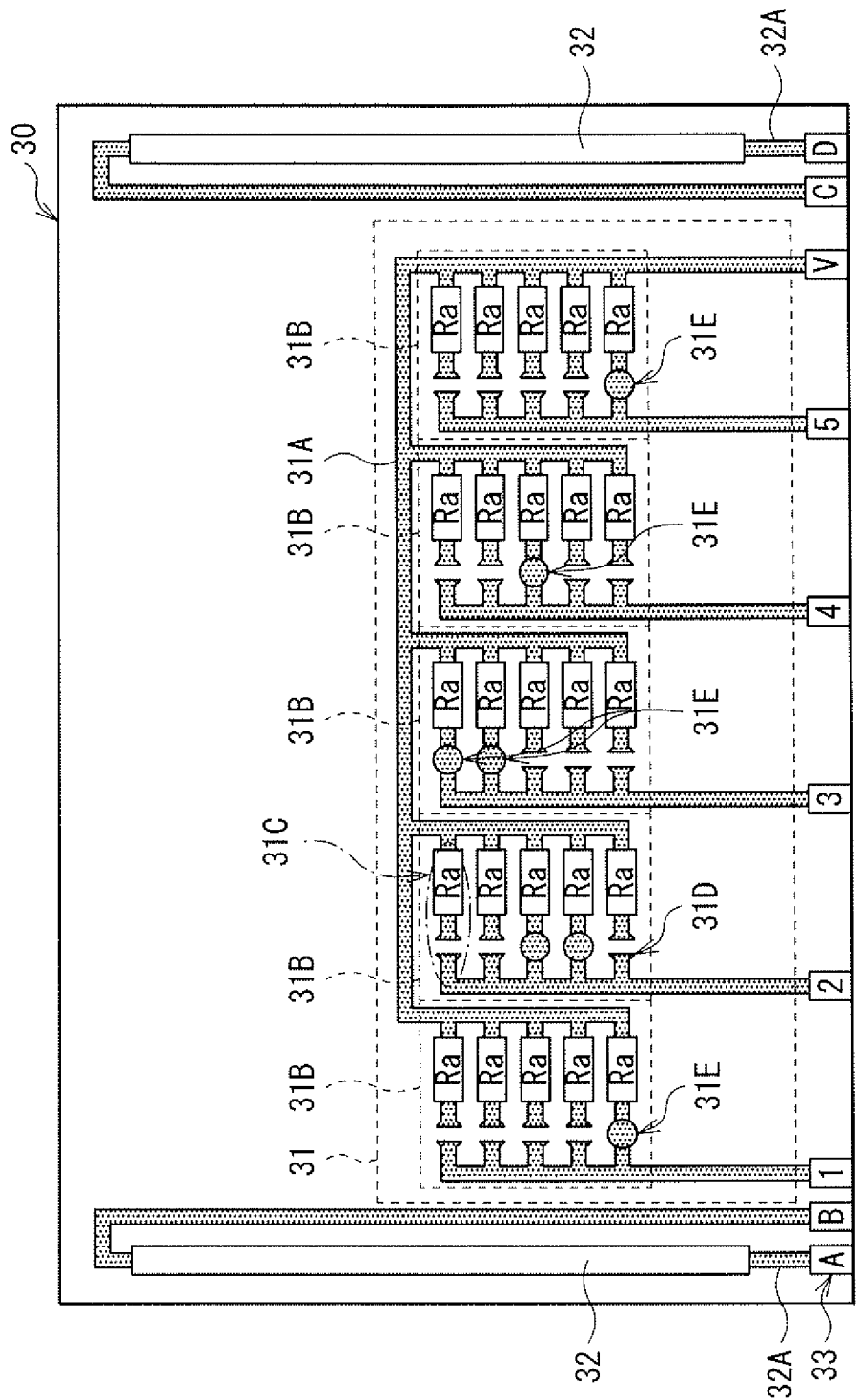
FIG. 19 is a view illustrating one Modification of the card in FIG. 9.

The unique information setting circuit 31 may have the following configuration. FIG. 19 illustrates one Modification of the unique information setting circuit 31. The unique information setting circuit 31 illustrated in FIG. 19 includes a certain number of parallel circuits 31B corresponding to the number of columns (for example, five) of the unique information 12C. Each parallel circuit 31B includes a parallel circuit including a plurality of circuit blocks 31C connected in parallel, each circuit block having one or a plurality of breaks, and a conductive component that forces the one, or all or part of the plurality of breaks, into conduction. For example, the conductive component may be configured of a conductive paste.

The parallel circuits 31B, each including the plurality of circuit blocks 31C connected in parallel, may have the same layout. In this case, printing sites of the conductive component may be appropriately set, thereby making it possible to optionally set the composite resistance of each parallel circuit 31B. Consequently, printing cost is remarkably reduced compared with the unique information setting circuit 31 illustrated in FIG. 9.

Figure 20:
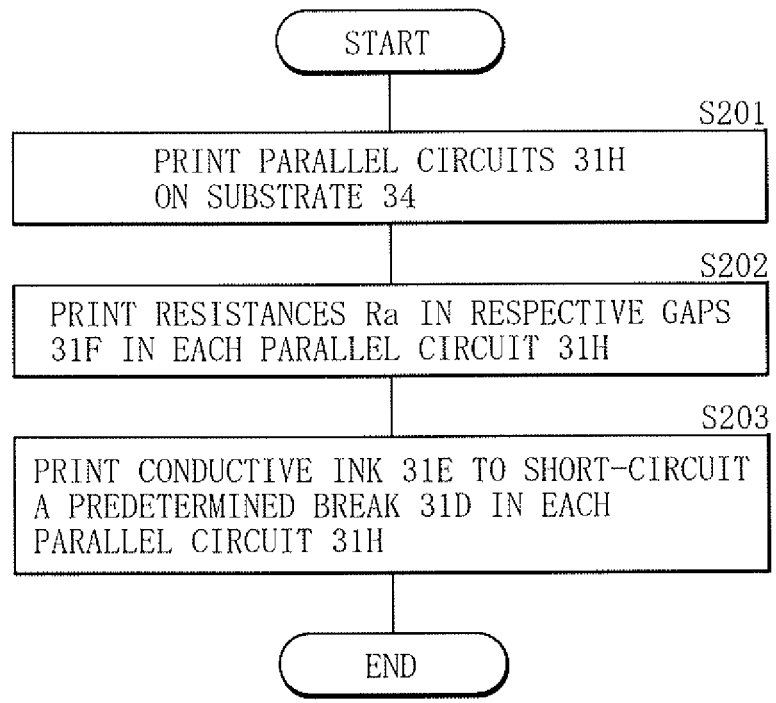
FIG. 20 is a flowchart illustrating an exemplary method of manufacturing the card illustrated in FIG. 19.
Figure 21A:
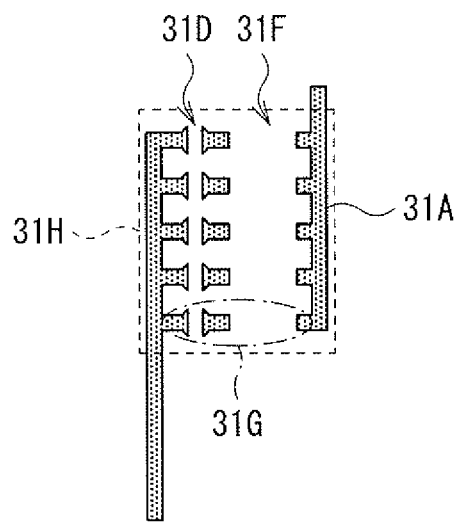
FIG. 21A is a plan view illustrating an exemplary manufacturing step of the card illustrated in FIG. 19.
Figure 21B:
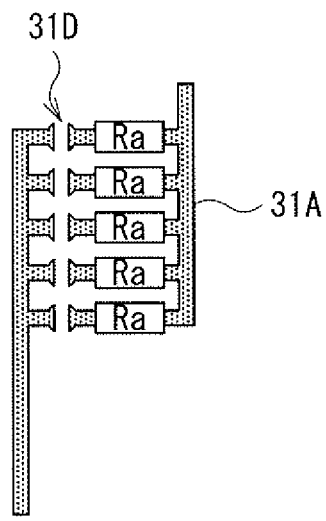
FIG. 21B is a view illustrating an exemplary manufacturing step following FIG. 21A.
Figure 21C:
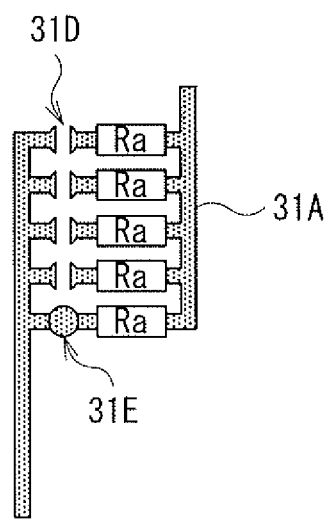
FIG. 21C is a view illustrating an exemplary manufacturing step following FIG. 21B.

An exemplary method of manufacturing the unique information setting circuit 31 illustrated in FIG. 19 is now described. FIG. 20 is a flowchart illustrating an exemplary manufacturing procedure of the unique information setting circuit 31 illustrated in FIG. 19. FIGS. 21A to 21C are plan views illustrating, in order, manufacturing steps of the unique information setting circuit 31 illustrated in FIG. 19. First, parallel circuits 31H are printed on the substrate 34, each parallel circuit 31H including a plurality of circuit blocks 31G connected in parallel, each circuit block 31G having one or a plurality of breaks 31D and one gap 31F (step S201) (FIG. 21A). Then, resistances Ra are printed in respective gaps 31F in each of the parallel circuits 31H (step S202) (FIG. 21B). At this time, the resistances Ra printed in the gap 31F may have the same resistance value. Furthermore, the values of the printed resistances Ra may be the same between all the parallel circuits 31H. Finally, a conductive ink 31E is printed such that any predetermined break 31D in each parallel circuit 31H is short-circuited (step S203) (FIG. 21C). In this way, the unique information setting circuit 31 illustrated in FIG. 19 may be manufactured.

Figure 22:
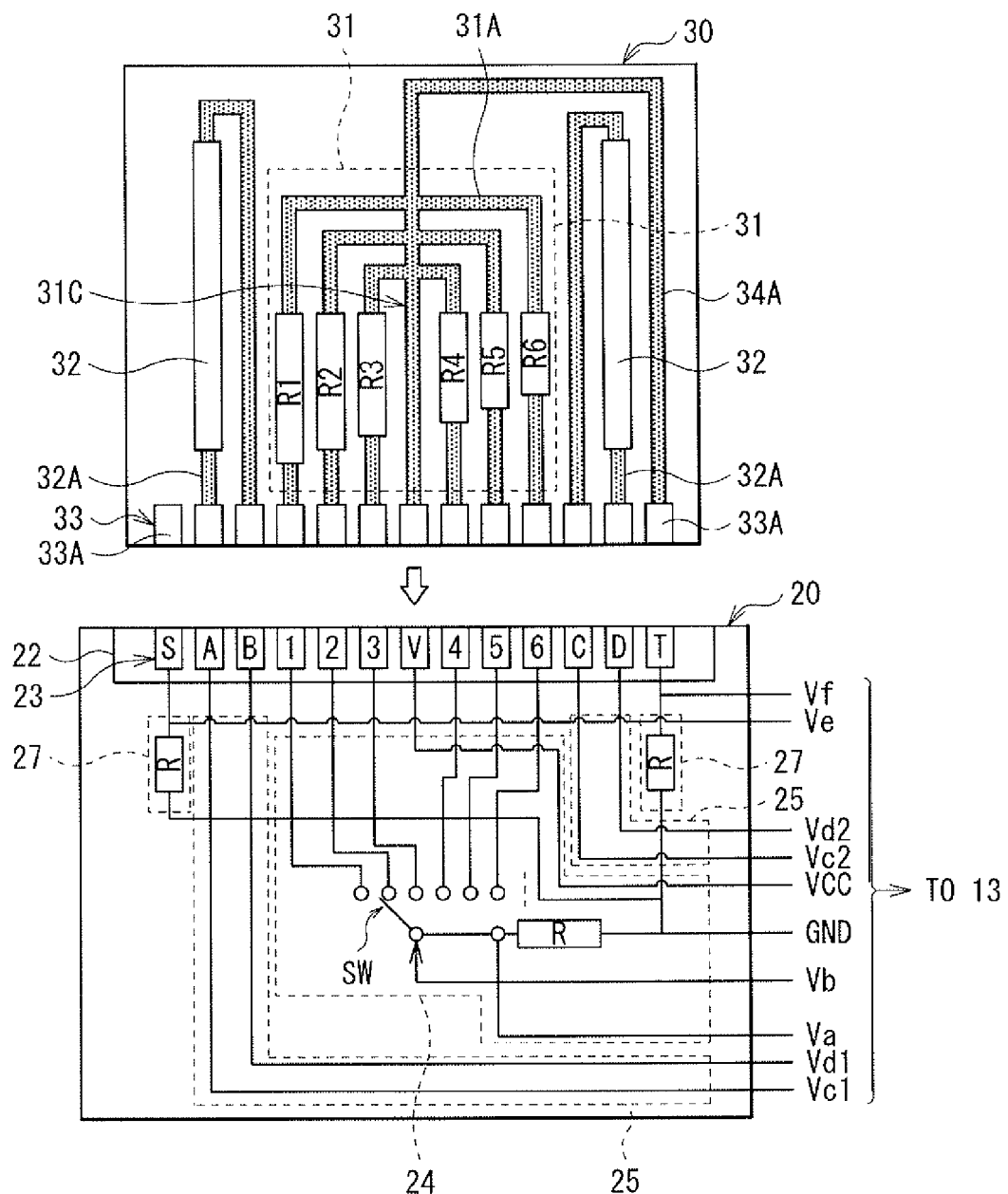
FIG. 22 is a view illustrating another Modification of the configuration of each of the connection section and the card in FIG. 1.

FIG. 22 illustrates one Modification of an internal configuration of each of the connection section 20 and the card 30. In the card 30 in FIG. 22, the unique information setting circuit 31 has a bilaterally symmetric circuit configuration. Specifically, one ends of the interconnections 31 that are connected to electrodes 33 other than an electrode 33 located at the lateral center among the electrodes 33 used in the unique information setting circuit 31, are connected to the interconnection 31A (interconnection 31C) that are connected to the electrode 33 located at the lateral center among the electrodes 33 used in the unique information setting circuit 31. The resistance values of the resistances R1 to R6 used in the unique information setting circuit 31 are irrelevant to the symmetry of the layout, and thus may be set optionally. Although FIG. 22 exemplifies a case where the interconnection 31C has no resistance, the interconnection 31C may have a certain resistance. Although the unique information setting circuit 31 has a bilaterally symmetric layout in FIG. 22, the layout may not be bilaterally symmetric.

The card 30 in FIG. 22 includes two electrodes 33 unusable for the unique information setting circuit 31 and the bending sensor 32. Such two electrodes 33 (hereinafter, referred to as "front/back detection electrodes 33A") are provided at two positions that are different from the center of the plurality of electrodes 33 arranged in a line, but are bilaterally symmetric positions among the positions of the electrodes 33 arranged in a line. For example, the two front/back detection electrodes 33A may each be provided at either lateral end of the electrodes 33 arranged in a line. For example, one of the two front/back detection electrodes 33A may not be connected to any interconnection, i.e., may be electrically open. The other of the two front/back detection electrodes 33A is connected to one end of an interconnection 34A that is electrically connected at the other end thereof to the interconnection 31C. As a result, when the card 30 illustrated in FIG. 22 is connected to the connection section 20, the two front/back detection electrodes 33A have voltages having values different from each other.

On the other hand, the connection section 20 has front/back detection circuits 27 each being provided for each front/back detection electrode 33A. For example, the front/back detection circuit 27 may include an electrode 23 to be connected to the front/back detection electrode 33A, and a resistance R connected to an interconnection to be set to a predetermined potential (for example, ground potential). Furthermore, for example, the front/back detection circuit 27 may include a front/back detection line connected to the electrode 23 to be connected to the front/back detection electrode 33A. The control section 11 compares a voltage Ve obtained from the front/back detection line provided in one of the two front/back detection circuits 27 to a voltage Vf obtained from the front/back detection line provided in the other thereof, and, for example, may identify the front or the back of the card 30 based on magnitude relation between the two voltages.

Figure 23:
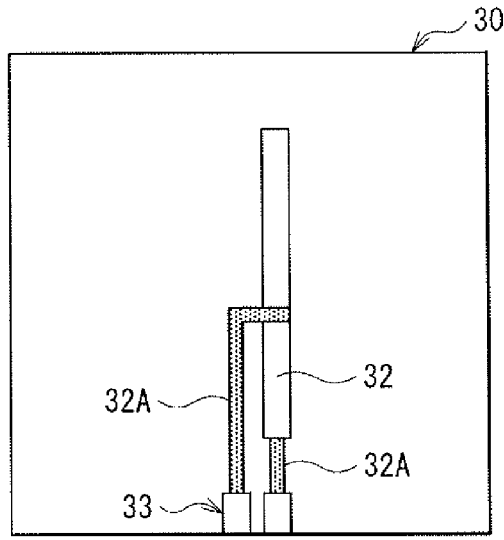
FIG. 23 is a view illustrating another exemplary interconnection connected to the bending sensor in any one of FIGS. 9, 19, and 22.
Figure 24A:
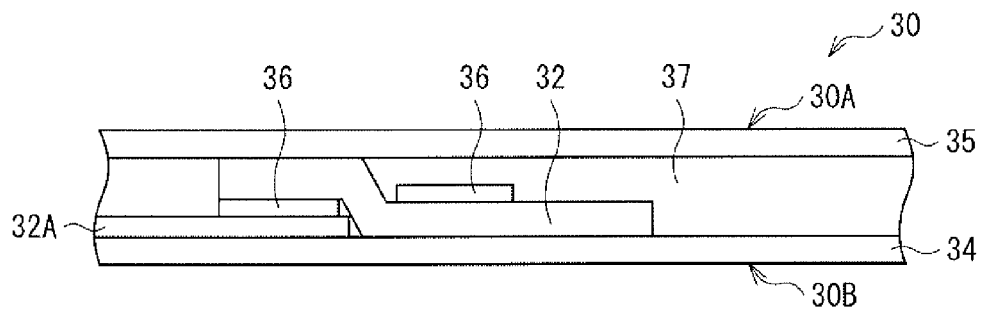
FIG. 24A is a view illustrating an exemplary sectional configuration of the bending sensor in FIG. 23.
Figure 24B:
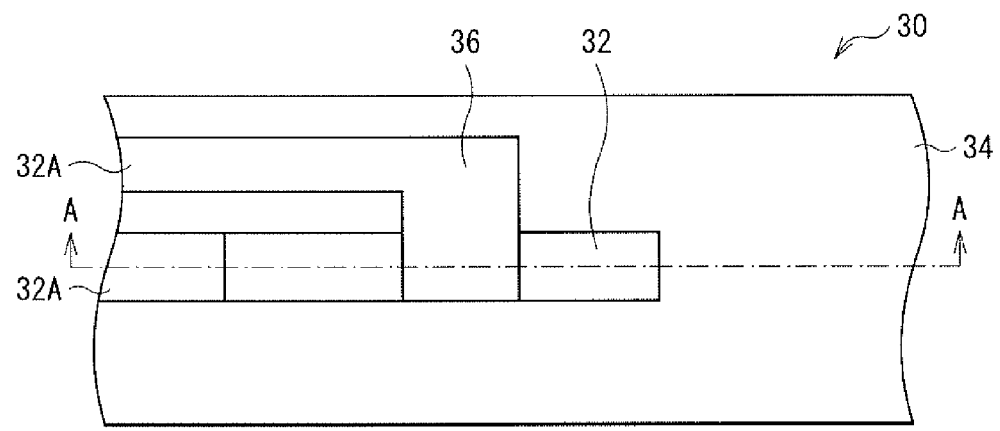
FIG. 24B is a view illustrating an exemplary planar configuration of the bending sensor in FIG. 23.

In any of the cards 30 illustrated in FIGS. 9, 19, and 22, the interconnection 32A is connected to either end section of each bending sensor 32. However, for example, as illustrated in FIG. 23, one of the two interconnections 32A, i.e., an interconnection 32A connected to the top may be connected to the center of the interconnection 32A or connected near the other of the interconnections 32A, i.e., another interconnection 32A connected to the bottom. In the case where an interconnection 32A is connected to the center of the interconnection 32A or connected near the other of the interconnections 32A, i.e., another interconnection 32A connected to the bottom, for example, as illustrated in FIGS. 24A and 24B, the interconnection 32A may be connected to the top of the bending sensor 32 with the conductive adhesive agent 36 therebetween. A conductive tape, ACF, or the like may be used in place of the conductive adhesive agent 36.

Figure 25A:
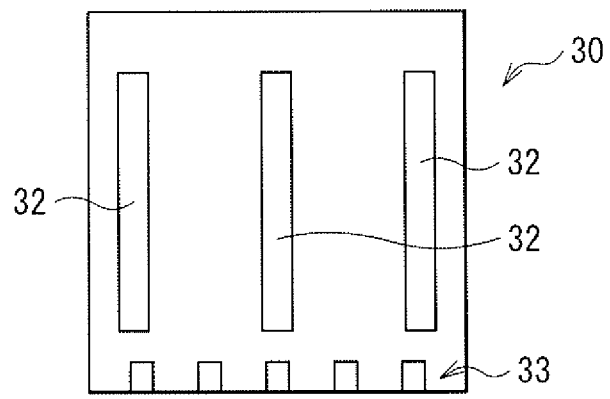
FIG. 25A is a view illustrating an exemplary layout of bending sensors in any one of FIGS. 9, 19, 22, and 23.
Figure 25B:
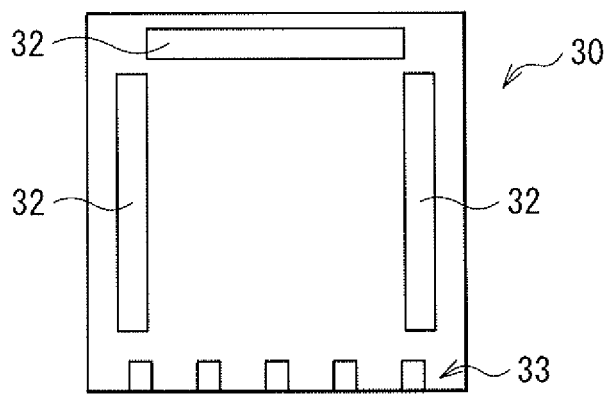
FIG. 25B is a view illustrating another exemplary layout of the bending sensors in any one of FIGS. 9, 19, 22, and 23.
Figure 25C:
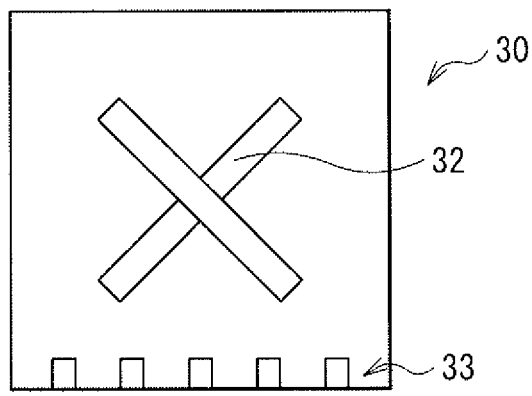
FIG. 25C is a view illustrating another exemplary layout of the bending sensors in any one of FIGS. 9, 19, 22, and 23.
Figure 25D:
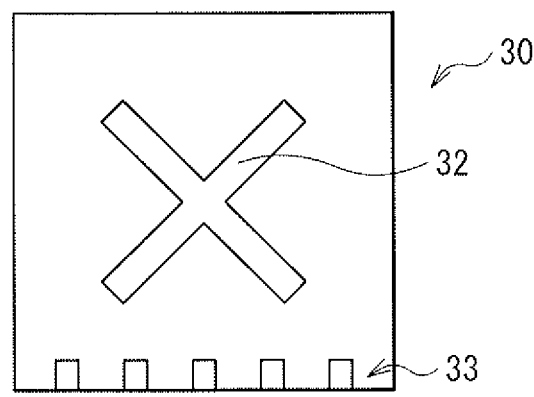
FIG. 25D is a view illustrating an exemplary shape of the bending sensor in any one of FIGS. 9, 19, 22, and 23.

In any of the cards 30 illustrated in FIGS. 9, 19, and 22, the card 30 has two bending sensors 32 that are disposed on respective lateral end edges of the card 30. However, for example, as illustrated in FIGS. 25A and 25B, the card 30 may have three bending sensors 32. As illustrated in FIG. 25B, all the bending sensors 32 may be provided on the end edges of the card 30. Alternatively, as illustrated in FIG. 25A, some of the bending sensors 32 may be provided at a position other than the end edges of the card 30 (for example, the center of the card 30). Alternatively, as illustrated in FIG. 25C, two bending sensors 32 may be disposed in a crossing manner while being insulated from each other. In addition, the bending sensor 32 may have a shape different from the simple belt shape. For example, as illustrated in FIG. 25D, the bending sensor 32 may be shaped into a letter X shape.

Description is now made on operation of the information processing unit 10 when the control section 11 interprets and executes an instruction of a loaded information processing program 12A.

Figure 26:
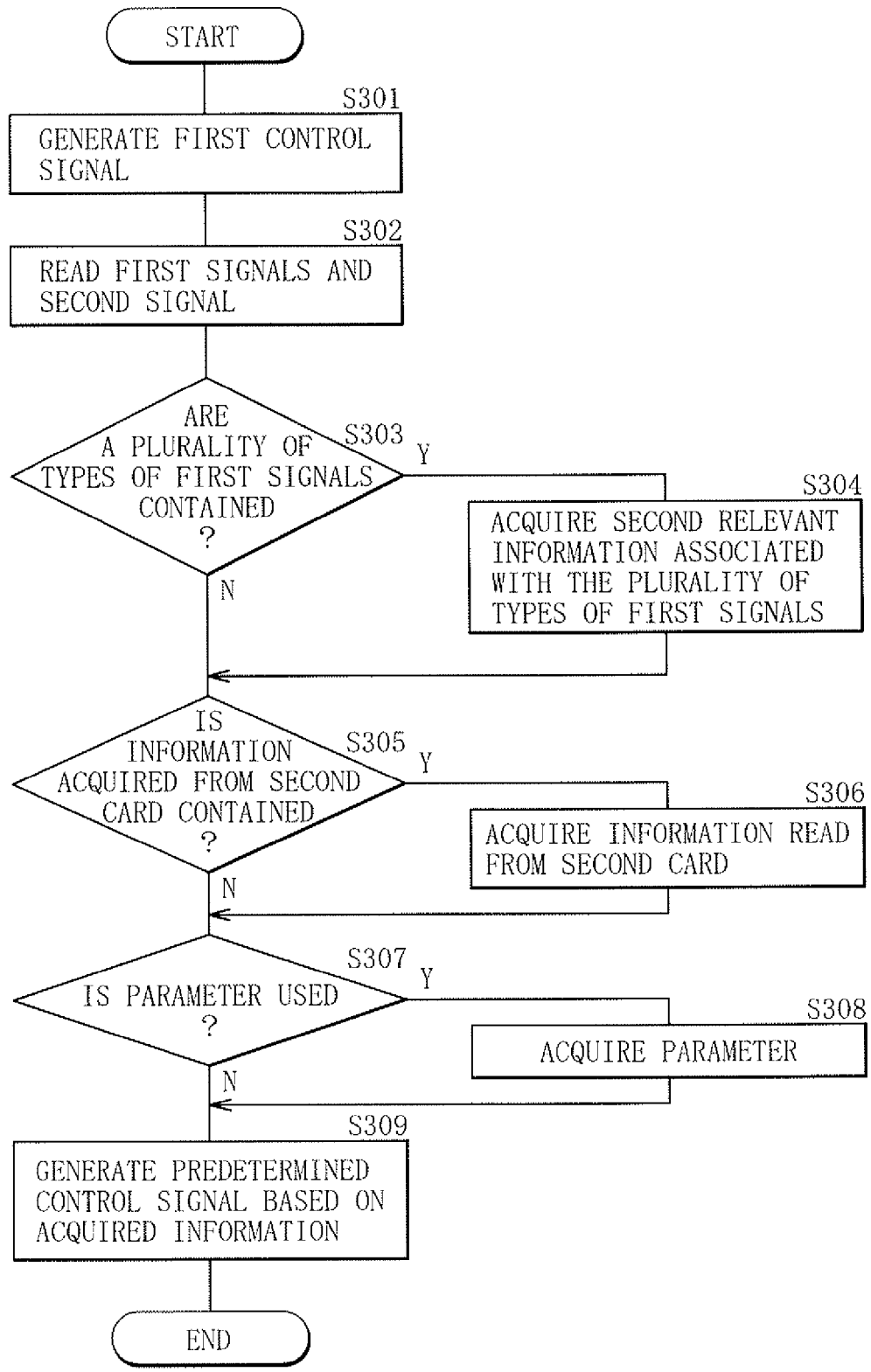
FIG. 26 is a flowchart illustrating an exemplary procedure in execution of an information processing program illustrated in FIGS. 2 and 3.

FIG. 26 illustrates an exemplary flow of an operation procedure of the information processing unit 10. The control section 11 may omit part of the operation illustrated in FIG. 26, or may add a new action thereto.

First, a user turns on the information processing unit 10. Thus, the information processing program 12A is loaded and started. The control section 11 operates according to an instruction of the loaded information processing program 12A. For example, the user may request start via the input section 16. Then, the control section 11 generates an image signal requesting insertion of the card 30 into the connection section 20, and sends the image signal to the display unit 50 via the image signal output section 14. As a result, an image prompting insertion of the card 30 and operation on the card 30 is displayed on a screen of the display unit 50.

The control section 11 synchronously generates a first control signal (step S301), and outputs the first control signal to the card reading control section 13. Then, the card reading control section 13 applies a predetermined voltage (for example, VCC or the control signal Vb for the switch SW) for reading information in the card 30 to the connection section 20 in response to the first control signal from the control section 11. Consequently, for example, VCC may be applied to the unique information setting circuit 31 via the connection section 20. Furthermore, in the case where the connection section 20 and the card 30 each have a front/back detection mechanism as illustrated in FIG. 22, for example, VCC may also be applied to the front/back detection electrodes 33A via the connection section 20.

In addition, the switch SW performs switching operation in response to the control signal Vb, thereby a voltage Va, which is given by dividing the predetermined voltage by the resistances (R1 to R4 and zero) in the unique information setting circuit 31 and the resistance (R) in the ID read circuit 24, is output as serial data to the ID detection line. For example, the voltage Va as the serial data may correspond to quinary numbers of several bits corresponding to unique information 12C of the card 30. Furthermore, in the case where the connection section 20 and the card 30 each have a front/back detection mechanism as illustrated in FIG. 22, for example, respective voltages Ve and Vf of the electrodes 23 connected to the front/back detection electrodes 33A may be output to the respective front/back detection lines.

At this time, when the user performs operation such as bending on the card 30, a predetermined voltage is output to the two interconnections of the bending information read circuit 25. In the case where the bending sensor 32 are provided at the positions illustrated in FIG. 25B, a potential difference V1, V2, or V3 between the two interconnections of each bending information read circuit 25 is as follows. The potential difference V1 is obtained from the bending sensor 32 at the left end of the card 30, the potential difference V2 is obtained from the bending sensor 32 at the upper end thereof, and the potential difference V3 is obtained from the bending sensor 32 at the right end thereof. The potential differences V1, V2, and V3 have the following characteristics depending on the operation content on the card 30. It is assumed here that when the bending sensor 32 is bent so as to be convex toward the back of the sheet, the bending sensor 32 outputs a positive voltage. The bending sensor 32 here is configured of an EAP device as illustrated in FIG. 10.

1. Bend to the near side $|V1|=|V3|>|V2|$, and $V1=V3>0$.

2. Bend to the back side $|V1|=|V3|>|V2|$, and $V1=V3<0$.

3. Twist upper right corner to the near side $|V1|<|V2|, |V1|<|V3|$, and $V2, V3>0$.

4. Twist upper left corner to the near side $|V3|<|V1|, |V3|<|V2|$, and $V1, V2>0$.

5. Quickly release near-side bending $-dV1/dt>Th$ and $-dV3/dt>Th$ ($Th$ represents threshold.)

6. Flip upper right corner by fingernail

Peak time tp1 of V1 is later than Peak time tp2 of V2 and Peak time tp3 of V3.

The above-described results allow, if a polymer actuator is used as the bending sensor 32, the three bending sensors 32 to detect various bending modes as described above. Hence, further increase in number of bending sensors 32 makes it possible to detect more complicated bending operation.

For example, the control section 11 may read, from the connection section 20, a voltage Va' (second signal) as serial data, voltages Ve and Vf, and potential differences V1, V2, and V3 (first signals) (step S302). At this time, for example, the control section 11 may identify unique information 12C of the card 30 from the voltage Va' as serial data. Similarly, for example, the control section 11 may identify a direction of the card 30 from the voltages Ve and Vf. Furthermore, for example, the control section 11 may identify a bending mode of the card 30 from the potential differences V1, V2, and V3.

Then, the control section 11 reads relevant information 12B (first relevant information) associated with the unique information 12C from a database in the server 40 via the network communication section 15. For example, when the unique information 12C is 00001, the control section 11 may read the relevant information 12B corresponding to the unique information 12C of 00001 from the database in the server 40, as illustrated in FIG. 4.

Then, for example, the control section 11 may examine several conditions before generating a predetermined control signal. Specifically, the control section 11 determines whether information acquired from one card 30 contains a plurality of types of first signals or not (step S303). If a user has input a plurality of bending modes being temporally consecutive, the plurality of first signals acquired from one card 30 contain information corresponding to a plurality of types of bending modes. In such a case, the control section 11 necessarily identifies the plurality of types of bending modes from the plurality of first signals acquired from one card 30. Hence, for example, if the control section 11 identifies the plurality of types of bending modes from the plurality of first signals acquired from one card 30, the control section 11 determines the information acquired from one card 30 contains a plurality of types of first signals. Then, the control section 11 acquires (extracts) second relevant information associated with "a plurality of bending modes being temporally consecutive" corresponding to the plurality of types of first signals from the relevant information 12B that has been acquired from the server 40 (step S304), for example. To describe this with reference to FIG. 4, for example, if the control section 11 identifies two types of bending modes, a01 and a02, the control section 11 acquires (extracts) information (skill b04, strength c04, and sound d04) associated with "a plurality of bending modes being temporally consecutive", (a01+a02), from the relevant information 12B that has been acquired from the server 40.

Then, when the control section 11 generates the predetermined control signal based on the first signals and the second signal acquired from a first card as one of the plurality of cards 30, the control section 11 determines whether information acquired from the connection section 20 contains information acquired from one or a plurality of second cards different from the first card among the plurality of cards 30 (step S305).

If two users are each inserting a card 30 into the connection section 20, the information acquired from the connection section 20 naturally contains two pieces of unique information 12C of the two cards 30. Moreover, if two users are each operating the card 30 after inserting a card 30 into the connection section 20, the information acquired from the connection sections 20 contains not only the unique information 12C of each card 30 but also one or a plurality of types of first signals obtained from each card 30. In such a case, the control section 11 necessarily detects, in the information acquired from the connection sections 20, one or a plurality of pieces of unique information 12C (unique information 12C') different from the unique information 12C of the first card among the plurality of cards 30, and necessarily identifies one or a plurality of types of bending modes from the one or the plurality of types of first signals acquired from the card 30 corresponding to the unique information 12C'. Hence, for example, if the control section 11 detects one or a plurality of pieces of unique information 12C' from the information acquired from the connection sections 20, the control section 11 determines the information acquired from the connection sections 20 contains information acquired from the one or the plurality of second cards, and acquires (extracts) the detected one or the detected plurality of pieces of unique information 12C' (step S306). Furthermore, for example, if the control section 11 identifies one or a plurality of types of bending modes from the one or the plurality of types of first signals acquired from the card 30 corresponding to the unique information 12C', the control section 11 acquires (extracts) the identified, one or the plurality of types of bending modes (step S306).

Then, the control section 11 determines whether a parameter, the content of which varies depending on acquisition timing or an acquisition situation of each of the first and second signals, is used or not (step S307). It is assumed that acquisition timing of each of the first and second signals is in a special mode different from a normal mode set by the information processing program 12A. In such a case, the control section 11 necessarily detects that a mode corresponding to the above-described parameter is the special mode. Hence, for example, if the control section 11 detects the mode corresponding to the above-described parameter is the special mode, the control section 11 determines "since the mode is the special mode, the special mode is used for generation of the predetermined control signal", and acquires the special mode as the parameter (step S308).

Finally, the control section 11 generates the predetermined control signal based on the information acquired after determination on the above-described various conditions, the first signals, the second signal, and the relevant information 12B associated with the unique information 12C (step S309). Specifically, the control section 11 generates the predetermined control signal using the second relevant information in addition to the first signals, the second signal, and the relevant information 12B. In addition, the control section 11 generates the predetermined control signal using the information acquired from the one or the plurality of second cards in addition to the first signals, the second signal, and the relevant information 12B. In addition, the control section 11 generates the predetermined control signal using the parameter, the content of which varies depending on acquisition timing or an acquisition situation of each of the first and second signals, in addition to the first signals, the second signal, and the relevant information 12B. It is to be noted that the control section 11 may omit one or more of the above-described various conditions. Hence, the control section 11 may omit determination on any of the above-described conditions, and may generate the predetermined control signal based on the first signals, the second signal, and the relevant information 12B associated with the unique information 12C.

Some effects are now described.

In the card 30 of this embodiment, a signal correlative to curvature of the substrate 34 is output from one or a plurality of bending sensors 32 in response to a voltage applied from the outside (the connection section), and a signal on unique information 12C is output from the unique information setting circuit 31 in response to a voltage applied from the outside (the connection section). In this way, in the card 30 of this embodiment, bending information and unique information 12C of the card 30 are read from the inside of the card 30 by applying a voltage from the outside (the connection section). As a result, information is read from the inside of the card without RFID or barcode. Consequently, an inexpensive card 30 with less limitation in design is achieved.

Moreover, in the information processing unit 10 and the information processing program 12A of this embodiment, a predetermined voltage is applied to the card 30, thereby bending information and unique information 12C of the card 30 are read from the inside of the card 30, and a predetermined control signal is generated using such read information. As a result, information is read from the inside of the card 30 without communication with RFID or camera reading of barcode. Consequently, inexpensive information processing with a card is achieved.

Moreover, in this embodiment, an operation instruction is made not only based on the unique information 12C contained in the card 30, but also based on a combination of the unique information 12C, a bending direction or a bending level of the card 30, and the like. As a result, operation complexity or variation of game development is expanded compared with a case where only the unique information 12C contained in the card 30 is used. Moreover, in this embodiment, since game operation is performed through bending of the card 30 or the like, for example, a picture on a card may be more directly associated with response of the information processing unit 10, thereby making it possible to provide game experience with an increased feeling of preoccupation.

2. Modification

Although the present technology has been described with the example embodiment, the technology is not limited thereto, and various modifications or alterations thereof may be made.

Figure 27:
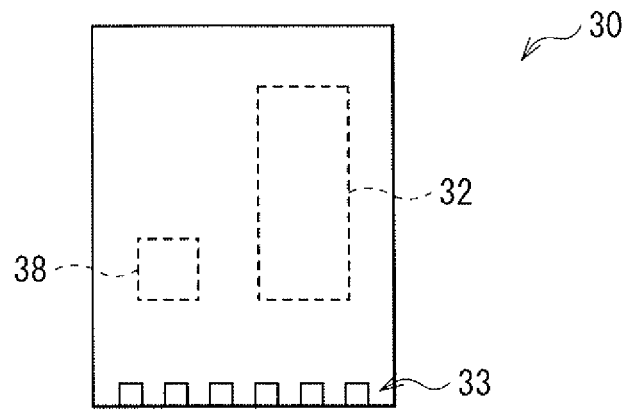
FIG. 27 is a view illustrating a first Modification of the card in FIG. 6.

In the above-described embodiment, for example, as illustrated in FIG. 27, a memory IC 38 that stores the information processing program 12A or information such as relevant information 12B may be provided in the inside of the card 30 in place of the unique information setting circuit 31. For example, the memory IC 38 may be provided in the same layer as a layer of the bending sensor 32. For example, the memory IC 38 may be provided on a substrate 34 common to the bending sensor 32. In this Modification, unique information 12C in the memory IC 38 may be rewritten, or relevant information 12B may be stored in the memory IC 38. Moreover, in this Modification, bending operation history or the number of bending operation may be stored in the memory IC 38 and thus may be read when the card is connected to the connection section 20. As a result, variation of game development is further expanded.

Moreover, in the above-described embodiment and the Modification thereof, for example, the substrate 35 may be omitted, i.e., the card 30 may include only the substrate 34 as its substrate. In such a case, while a surface, on which the unique information setting circuit 31 and the bending sensor 32 are provided, is a design surface, the unique information setting circuit 31 may be formed by printing, and the bending sensor 32 is almost not limited in shape; hence, design is less limited by devising the shape and layout of each of the unique information setting circuit 31 and the bending sensor 32.

Figure 28:
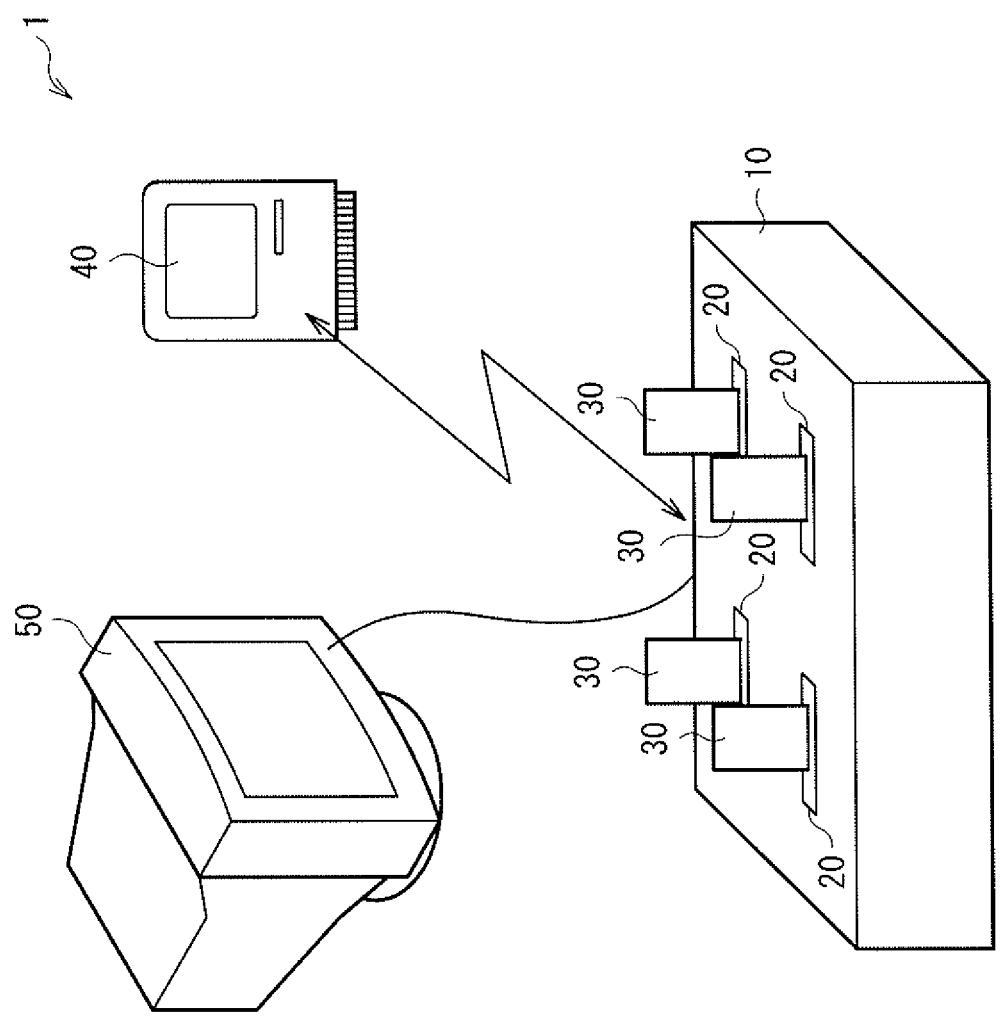
FIG. 28 is a view illustrating a first Modification of the schematic configuration of the information processing network illustrated in FIG. 1.
Figure 29:
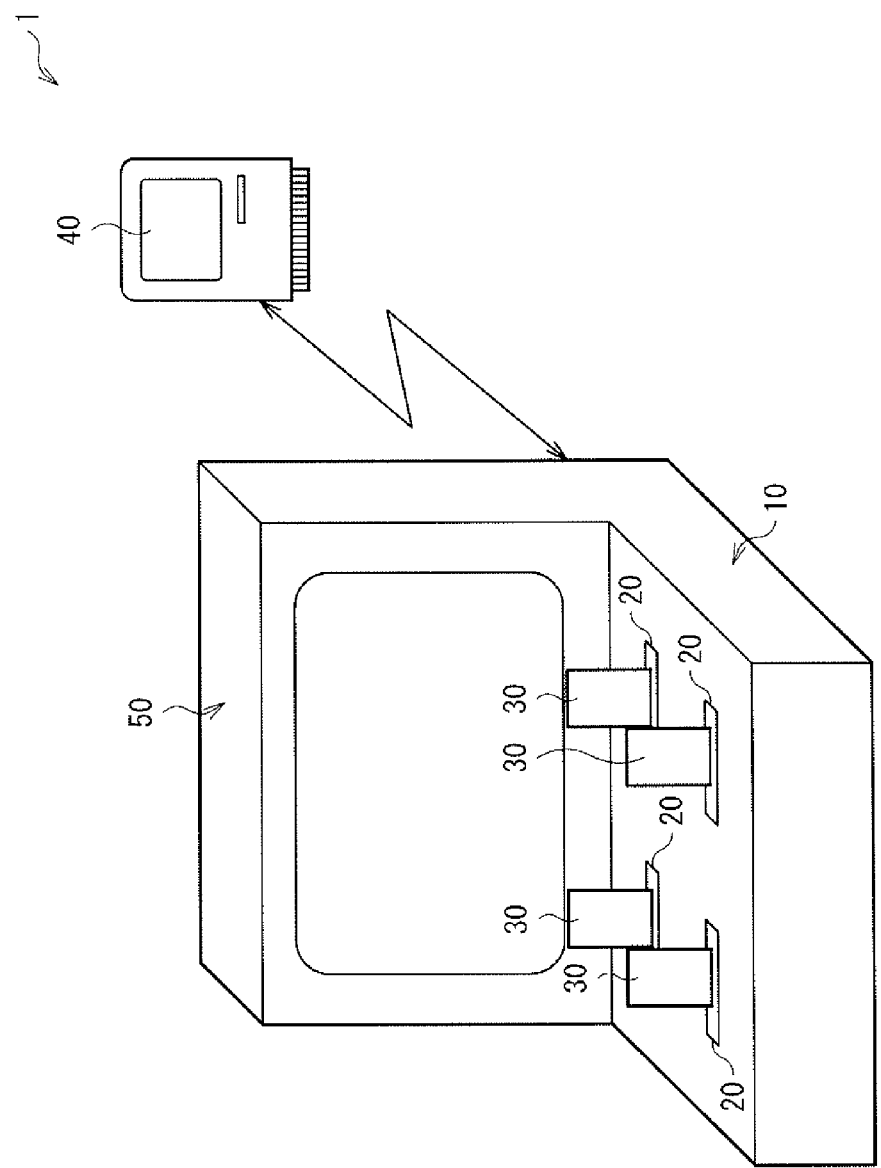
FIG. 29 is a view illustrating a second Modification of the schematic configuration of the information processing network illustrated in FIG. 1.

In the above-described embodiment and the Modification thereof, for example, as illustrated in FIG. 28, one or a plurality of connection sections 20 may be provided with the information processing unit 10 in one unit. Moreover, in the above-described embodiment and the Modification thereof, for example, as illustrated in FIG. 29, not only one or a plurality of connection sections 20 but also the display unit 50 may be provided with the information processing unit 10 in one unit. In such cases, for example, variation of game development may be further expanded by devising the layout of the one or the plurality of connection sections 20.

Figure 30:
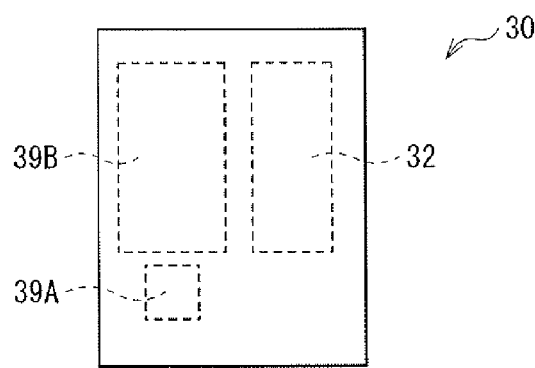
FIG. 30 is a view illustrating a second Modification of the card in FIG. 6.
Figure 31:
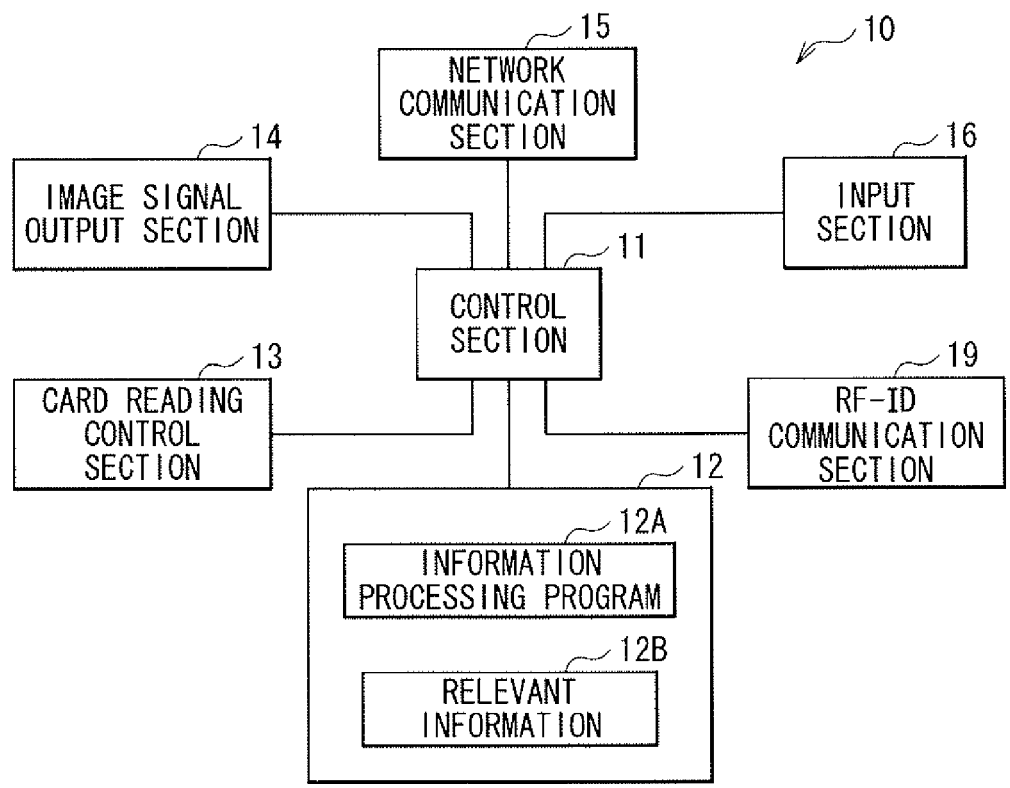
FIG. 31 is a view illustrating an exemplary functional block of an information processing unit in an information processing network using the card illustrated in FIG. 30.
Figure 32:
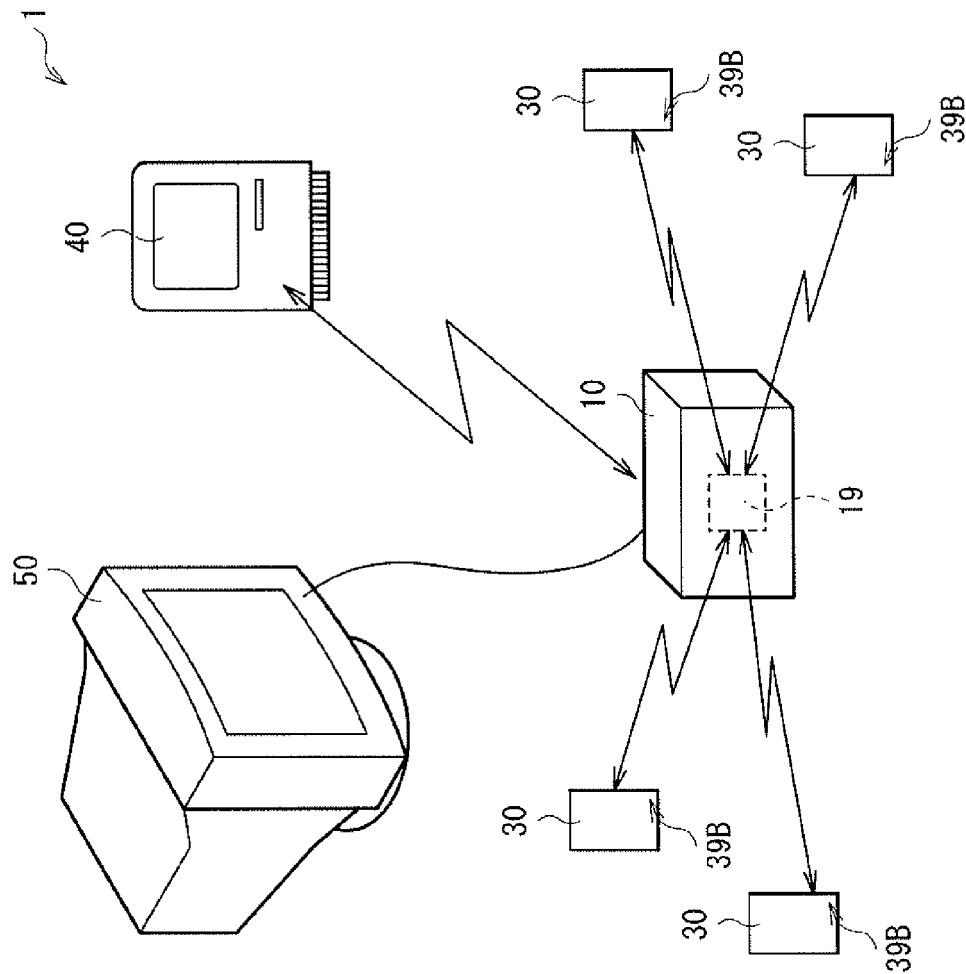
FIG. 32 is a view illustrating an exemplary schematic configuration of the information processing network using the card illustrated in FIG. 30.

In the above-described embodiment and the Modification thereof, for example, as illustrated in FIG. 30, radio frequency identification (RF-ID) including control IC 39A and an antenna 39B connected to each other may be provided in the card 30 in place of the unique information setting circuit 31 or the memory IC 28. The control IC 39A (wirelessly) communicates with an RF-ID communication section 19 via the antenna 39B. The control IC 39A further includes a storage section that stores unique information 12C and the like. In this case, for example, as illustrated in FIG. 31, the information processing unit 10 may include the RF-ID communication section 19 communicable with the RF-ID. For example, as illustrated in FIG. 32, the RF-ID communication section 19 may (wirelessly) communicate with each control IC 39A via the antenna 39B. The RF-ID communication section 19 may be formed with the information processing unit 10 in one unit, or may be formed separately from the information processing unit 10 (in other words, formed as an external device).

Figure 33A:
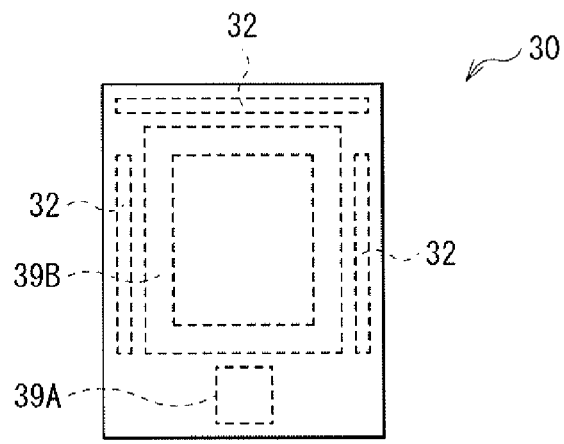
FIG. 33A is a view illustrating an exemplary internal configuration of the card illustrated in FIG. 30.
Figure 33B:
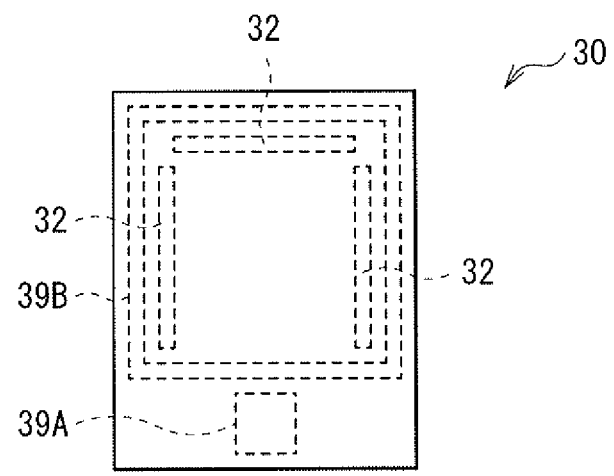
FIG. 33B is a view illustrating another exemplary internal configuration of the card illustrated in FIG. 30.

For example, the antenna 39B may be configured of an antenna coil. For example, the RF-ID may be provided in the same layer as a layer of the bending sensor 32. For example, the RF-ID may be provided on the substrate 34 common to the bending sensor 32. For example, as illustrated in FIG. 33A, the bending sensor 32 may be disposed in the periphery (outer circumferential region) of the antenna 39B. Alternatively, for example, as illustrated in FIG. 33B, the bending sensor 32 may be disposed in an open region of the antenna 39B.

In this Modification, unique information 12C in the control IC 39A may be rewritten, or relevant information 12B may be stored in the control IC 39A. Moreover, in this Modification, bending operation history or the number of bending operation may be stored in the control IC 39A and may be read when the card is connected to the connection section 20. As a result, variation of game development is further expanded.

Figure 34:
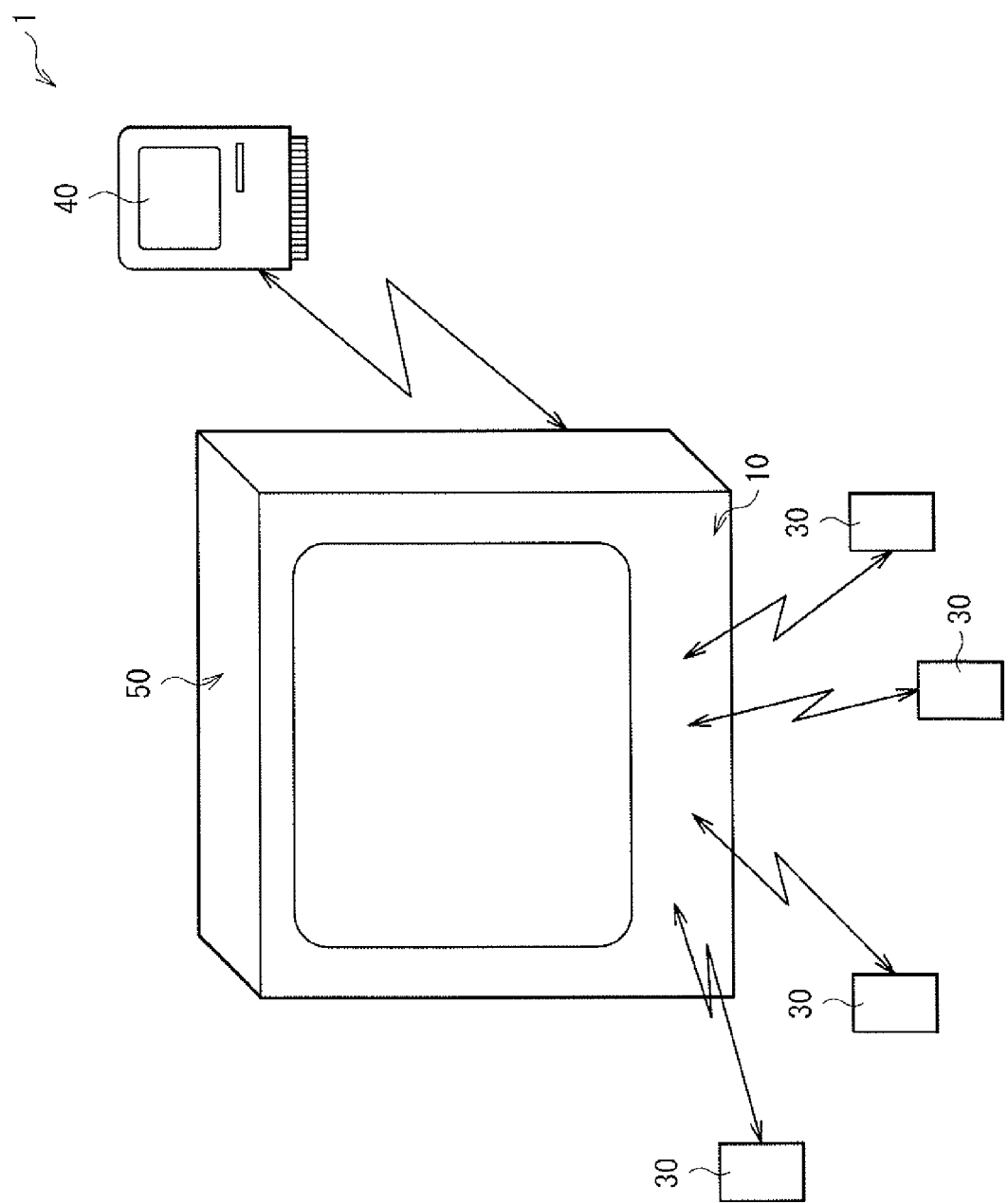
FIG. 34 is a view illustrating another exemplary schematic configuration of the information processing network using the card illustrated in FIG. 30.

In the above-described embodiment and the Modification thereof, for example, as illustrated in FIG. 34, the display unit 50 may be provided with the information processing unit 10 in one unit. In such a case, for example, variation of game development may be further expanded by devising a layout of the one or the plurality of connection sections 20.

Furthermore, the technology encompasses any possible combination of some or all of the various embodiments described herein and incorporated herein.

It is possible to achieve at least the following configurations from the above-described example embodiments of the disclosure.

(1)
A card comprising an information setting unit configured to output a first signal including unique information of the card; and a bending sensor configured to output a second signal corresponding to a curvature of the card.

(2)
A card according to (1), wherein the curvature corresponds to at least one of a bending, a twisting, and a flipping of the card.

(3)
A card according to any one of (1) and (2), wherein the second signal corresponds to at least one of a curvature direction and a curvature level.

(4)
A card according to any one of (1) to (3), wherein the information setting unit is a circuit having a plurality of interconnections having respective resistance values.

(5)
A card according to any one of (1) to (4), wherein the bending sensor is configured to generate a potential difference between a top of the bending sensor and a bottom of the bending sensor.

(6)
A card according to any one of (1) to (5), further comprising a plurality of electrodes configured to be in contact with a detachably connected connection section, wherein the first signal and the second signal are output to the connection section via the electrodes.

(7)
A card according to any one of (1) to (6), further comprising a bendable substrate, wherein the bending sensor curves along the bendable substrate.

(8)
A card according to any one of (1) to (7), wherein the bending sensor includes at least two bending sensor units.

(9)
A card according to (8), wherein the at least two bending sensor units are disposed on respective lateral edges of the card.

(10)
A card according to (8), wherein the at least two bending sensor units overlap each other.

(11)
A card according to any one of (1) to (7), wherein the bending sensor includes at least three bending sensor units.

(12)
A card according to (11), wherein the at least three bending sensor units are provided on separate edges of the card.

(13)
A card according to any one of (1) to (7), wherein the bending sensor has an X shape.

(14)
An information processing apparatus comprising a card reading unit configured to acquire information from a card, a processor, and a memory device. The memory device storing instructions which when executed by the processor, causes the processor to acquire unique information from the card and acquire curvature information from the card corresponding to a curvature of the card.

(15)
An information processing apparatus according to (14), further comprising a communication unit configured to communicate with a server, wherein the instructions further cause the processor to acquire relevant information from the server corresponding to the unique information acquired from the card.

(16)
An information processing apparatus according to (15), wherein the relevant information includes at least one bending mode associated with at least one parameter.

(17)
An information processing apparatus according to (16), wherein the instructions further cause the processor to determine a bending mode based on the relevant information acquired from the server and the curvature information acquired from the card, and read a parameter associated with the determined bending mode.

(18)
An information processing apparatus according to any one of (16) and (17), wherein the at least one parameter includes at least one of a skill, a strength, and a sound for use in a game.

(19)
An information processing apparatus according to any one of (16) to (18), wherein at least one parameter is associated with an intensity of a bending mode.

(20)
An information processing apparatus according to any one of (14) to (19), wherein the curvature corresponds to at least one of a bending, a twisting, and a flipping of the card.

(21)
An information processing apparatus according to any one of (14) to (20), wherein the curvature information includes at least one of a curvature direction and a curvature level.

(22)
An information processing apparatus according to any one of (14) to (21), wherein the card reader includes a plurality of electrodes provided to detachably connect to the card.

(23)
A non-transitory computer readable storage medium storing a computer program. The computer program is for causing an information processing apparatus including a card reading unit to acquire unique information from a card; and acquire curvature information from the card corresponding to a curvature of the card.

[1] A card, including:
one or a plurality of substrates;
one or a plurality of sensors disposed parallel to a first substrate and outputting a first signal correlative to curvature of the first substrate, the first substrate being the one or one of the plurality of substrates; and
a circuit disposed on a second substrate and outputting, in response to a voltage applied from outside, a second signal on unique information, the second substrate being the one or one of the plurality of substrates.

[2] The card according to [1], wherein the one or the plurality of sensors and the circuit are provided in same layer.

[3] The card according to [1] or [2], wherein
the first substrate serves as the second substrate as a common substrate, and
one or more of the plurality of substrates, excluding the first substrate and the second substrate, covers top of the one or the plurality of sensors and top of the circuit.

[4] The card according to any one of [1] to [3], further including:
a first interconnection;
a second interconnection;
a first terminal; and
a second terminal,
wherein the one or each of the plurality of sensors curves along with the curvature of the first substrate to generate a potential difference between top and bottom of the one or corresponding one of the plurality of sensors,
the first interconnection is electrically connected to the top of the one or corresponding one of the plurality of sensors,
the second interconnection is electrically connected to the bottom of the one or corresponding one of the plurality of sensors,
the first terminal is electrically connected to the first interconnection, and is disposed on an end edge of the first substrate, and
the second terminal is electrically connected to the second interconnection, and is disposed on the end edge of the first substrate.

[5] The card according to any one of [1] to [4], further including a plurality of third terminals,
wherein the circuit includes a printing pattern formed by printing on the second substrate, and
the plurality of third terminals are electrically connected to the printing pattern, and are disposed on an end edge of the second substrate.

[6] The card according to [5], wherein the circuit includes:
a parallel circuit including a plurality of circuit blocks that are connected in parallel, each of the circuit blocks including one or a plurality of breaks; and
a conductive component forcing the one, or all or part of the plurality of breaks, into conduction.

[7] The card according to [5], wherein the circuit includes a parallel circuit including a plurality of circuit blocks that are connected in parallel, the circuit blocks having resistance values different from one another.

[8] An information processing unit, including:
a read section reading a first signal via one or a plurality of connection sections configured to be detachably connected to one or a plurality of cards, the first signal being correlative to curvature of a substrate, and the one or each of the plurality of cards including one or a plurality of sensors outputting the first signal; and
a generation section generating a predetermined control signal, based on the first signal read by the read section.

[9] The information processing unit according to [8], wherein
the one or each of the plurality of cards includes a circuit that outputs, in response to a voltage applied from outside, a second signal on unique information,
the read section reads the second signal via the one or the plurality of connection sections, and
the generation section generates the predetermined control signal, based on the first signal, the second signal, and first relevant information that is associated with the unique information.

[10] The information processing unit according to [8] or [9], wherein, when information acquired from the one card contains a plurality of types of the first signals, the generation section generates the predetermined control signal, based further on second relevant information that is associated with the plurality of types of the first signals.

[11] The information processing unit according to any one of [8] to [10], wherein the generation section generates the predetermined control signal, based on the first signal acquired from a first card as one of the plurality of cards, and based further on information acquired from one or a plurality of second cards different from the first card among the plurality of cards.

[12] The information processing unit according to any one of [8] to [11], wherein the generation section generates the predetermined control signal, based further on a parameter whose content varies depending on acquisition timing or an acquisition situation of the first signal.

[13] The information processing unit according to any one of [8] to [12], wherein the one or each of the plurality of connection sections is provided separately from the read section and the generation section.

[14] A non-transitory machine-readable recording medium having a machine-readable information processing program embodied therein, the information processing program causing, when executed by a machine, the machine to implement a method, the method including:
reading a first signal via one or a plurality of connection sections configured to be detachably connected to one or a plurality of cards, the first signal being correlative to curvature of a substrate, and the one or each of the plurality of cards including one or a plurality of sensors outputting the first signal; and
generating a predetermined control signal, based on the read first signal.

[15] The non-transitory machine-readable recording medium according to [14], wherein the one or each of the plurality of cards includes a circuit that outputs, in response to a voltage applied from outside, a second signal on unique information, and wherein the information processing program causes, when executed by the machine, the machine to implement the method that further includes:
reading the second signal via the one or the plurality of connection sections by
applying a predetermined voltage to the one or the plurality of cards; and
generating the predetermined control signal, based on the read first signal, the read second signal, and first relevant information that is associated with the unique information.

[16] The non-transitory machine-readable recording medium according to [14] or [15], wherein the information processing program causes, when executed by the machine, the machine to implement the method that further includes:
generating, when information acquired from the one card contains a plurality of types of the first signals, the predetermined control signal, based further on second relevant information that is associated with the plurality of types of the first signals.

[17] The non-transitory machine-readable recording medium according to any one of [14] to [16], wherein the information processing program causes, when executed by the machine, the machine to implement the method that further includes generating the predetermined control signal, based on the first signal acquired from a first card as one of the plurality of cards, and based further on information acquired from one or a plurality of second cards different from the first card among the plurality of cards.

[18] The non-transitory machine-readable recording medium according to any one of [14] to [17], wherein the information processing program causes, when executed by the machine, the machine to implement the method that further includes generating the predetermined control signal, based further on a parameter whose content varies depending on acquisition timing or an acquisition situation of the first signal.

The present disclosure contains subject matter related to that disclosed in Japanese Priority Patent Application JP 2012-272140 filed in the Japan Patent Office on Dec. 13, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

REFERENCE SIGNS LIST

1 Information processing network
10 Information processing unit
11 Control section
12 Storage section
12A Information processing program
12B Relevant information
12C Unique information
13 Card reading control section
14 Image signal output section
15 Network communication section
16 Input section
17 Read section
18 Recording medium
19 RF-ID communication section
20 Connection section
21 Card holding section
22 Slot
23 Electrode
24 ID read circuit
25 Bending information read circuit
26 Cable
27 Front/back detection circuit
30 Card
30A Surface
30B Back
31 Unique information setting circuit
31A, 32A Interconnection
31B, 31H Parallel circuit
31C, 31G Circuit block
31D Break
31E Conductive ink
31F Gap
32-1 Polymer compound film
32-2, 32-3 Electrode film
32-4 Piezoelectric body
32 Bending sensor
33 Electrode
33A Front/back detection electrode
34, 35 Substrate
34A, 35A Cutout
36 Conductive adhesive agent
37 Insulating adhesive agent
38 Memory IC
39A Control IC
39B Antenna
40 Server
50 Display unit

The invention claimed is:

1. A system comprising:
a card comprising:
an information setting unit configured to output a first signal including unique information of the card; and
a bending sensor configured to output a second signal corresponding to a curvature of the card;
a server; and
an information processing apparatus comprising:
a card reading unit configured to acquire information from the card;
a processor: and
a memory device storing instructions which when executed by the processor, causes the processor to:
acquire unique information from the card: and
acquire curvature information from the card corresponding to a curvature of the card; and
a communication unit configured to communicate with the server,
wherein the instructions further cause the processor to acquire relevant information from the server corresponding to the unique information acquired from the card,
wherein the relevant information includes at least one bending mode associated with at least one parameter, and
wherein the instructions further cause the processor to determine a bending mode based on the relevant information acquired from the server and the curvature information acquired from the card, and read a parameter associated with the determined bending mode.

2. A card according to claim 1, wherein the curvature corresponds to at least one of a bending, a twisting, and a flipping of the card.

3. A card according to claim 1, wherein the second signal corresponds to at least one of a curvature direction and a curvature level.

4. A card according to claim 1, wherein the information setting unit is a circuit having a plurality of interconnections having respective resistance values.

5. A card according to claim 1, wherein the bending sensor is configured to generate a potential difference between a top of the bending sensor and a bottom of the bending sensor.

6. A card according to claim 1, further comprising:
a plurality of electrodes configured to be in contact with a detachably connected connection section,
wherein the first signal and the second signal are output to the connection section via the electrodes.

7. A card according to claim 1, further comprising:
a bendable substrate,
wherein the bending sensor curves along the bendable substrate.

8. A card according to claim 1, wherein the bending sensor includes at least two bending sensor units.

9. A card according to claim 8, wherein the at least two bending sensor units are disposed on respective lateral edges of the card.

10. A card according to claim 8, wherein the at least two bending sensor units overlap each other.

11. A card according to claim 1, wherein the bending sensor includes at least three bending sensor units.

12. A card according to claim 11, wherein the at least three bending sensor units are provided on separate edges of the card.

13. A card according to claim 1, wherein the bending sensor has an X shape.

14. An information processing apparatus comprising:
a card reading unit configured to acquire information from a card;
a processor;
a memory device storing instructions which when executed by the processor, causes the processor to:
acquire unique information from the card; and
acquire curvature information from the card corresponding to a curvature of the card; and
a communication unit configured to communicate with a server,
wherein the instructions further cause the processor to acquire relevant information from the server corresponding to the unique information acquired from the card,
wherein the relevant information includes at least one bending mode associated with at least one parameter, and
wherein the instructions further cause the processor to determine a bending mode based on the relevant information acquired from the server and the curvature information acquired from the card, and read a parameter associated with the determined bending mode.

15. An information processing apparatus according to claim 14, wherein the at least one parameter includes at least one of a skill, a strength, and a sound for use in a game.

16. An information processing apparatus according to claim 14, wherein at least one parameter is associated with an intensity of a bending mode.

17. An information processing apparatus according to claim 14, wherein the curvature corresponds to at least one of a bending, a twisting, and a flipping of the card.

18. An information processing apparatus according to claim 14, wherein the curvature information includes at least one of a curvature direction and a curvature level.

19. An information processing apparatus according to claim 14, wherein the card reader includes a plurality of electrodes provided to detachably connect to the card.

20. A non-transitory computer readable storage medium storing a computer program for causing an information processing apparatus including a card reading unit to:
acquire unique information from a card;
acquire curvature information from the card corresponding to a curvature of the card; and
communicate with a server,
wherein the computer program further causes the information processing apparatus to acquire relevant information from the server corresponding to the unique information acquired from the card,
wherein the relevant information includes at least one bending mode associated with at least one parameter, and
wherein the computer program further causes the information processing apparatus to determine a bending mode based on the relevant information acquired from the server and the curvature information acquired from the card, and read a parameter associated with the determined bending mode.

* * * * *